US008803353B2

(12) United States Patent
Jacob

(10) Patent No.: US 8,803,353 B2
(45) Date of Patent: Aug. 12, 2014

(54) TURBINE-GENERATOR DRIVEN BY COMPRESSED AIR AND MAGNET MOTOR

(76) Inventor: Joseph Sajan Jacob, Norcross, GA (US)

( * ) Notice: Subject to any disclaimer, the term of this patent is extended or adjusted under 35 U.S.C. 154(b) by 115 days.

(21) Appl. No.: 13/478,972

(22) Filed: May 23, 2012

(65) Prior Publication Data

US 2013/0134713 A1    May 30, 2013

Related U.S. Application Data

(63) Continuation-in-part of application No. 12/954,012, filed on Nov. 24, 2010, now Pat. No. 8,581,429.

(60) Provisional application No. 61/489,022, filed on May 23, 2011.

(51) Int. Cl.
*H02P 9/40* (2006.01)

(52) U.S. Cl.
USPC .............................................. 290/52; 290/1 A

(58) Field of Classification Search
USPC .................................. 290/1 A, 52, 54; 60/409
See application file for complete search history.

(56) References Cited

U.S. PATENT DOCUMENTS

| 5,553,454 | A  | * | 9/1996  | Mortner ............................ 60/409 |
| 6,031,294 | A  | * | 2/2000  | Geis et al. ......................... 290/52 |
| 6,064,122 | A  | * | 5/2000  | McConnell ....................... 290/32 |
| 6,512,305 | B1 | * | 1/2003  | Pinkerton et al. ................ 290/52 |
| 8,106,563 | B2 | * | 1/2012  | Ritchey ........................... 310/268 |
| 8,212,445 | B2 | * | 7/2012  | Ritchey ........................... 310/112 |
| 8,581,429 | B2 | * | 11/2013 | Jacob ............................... 290/52 |
| 8,614,529 | B2 | * | 12/2013 | Ritchey ............................ 310/78 |

* cited by examiner

*Primary Examiner* — Nicholas Ponomarenko
(74) *Attorney, Agent, or Firm* — Kilpatrick Townsend & Stockton LLP

(57) ABSTRACT

A turbine assembly, which may be part of a turbine generator assembly, includes a turbine flywheel assembly and a magnet motor within a turbine casing. The turbine flywheel assembly comprises a turbine flywheel rotatably coupled to a shaft, turbine blade assemblies mounted thereon and a magnet motor rotor assembly coupled to the shaft. The magnet motor rotor assembly includes rotor permanent magnets arranged in a ring around the shaft. The same pole of each includes rotor permanent magnet faces outward away from the shaft. A magnet motor stator assembly comprises stator magnet assemblies, each comprising a stator electromagnet and a stator permanent magnet, arranged in a ring around the magnet motor rotor assembly to exert replusive force on the nearest rotor permanent magnet. Selectably controllable nozzles inject compressed air onto the turbine blades. Electromagnet controller(s) individually and selectably activate, deactivate and polarity-switch the stator electromagnets.

20 Claims, 31 Drawing Sheets

(Cross Section)

(Perspective)

(Bottom View)

(Top View)

(Cross Section)

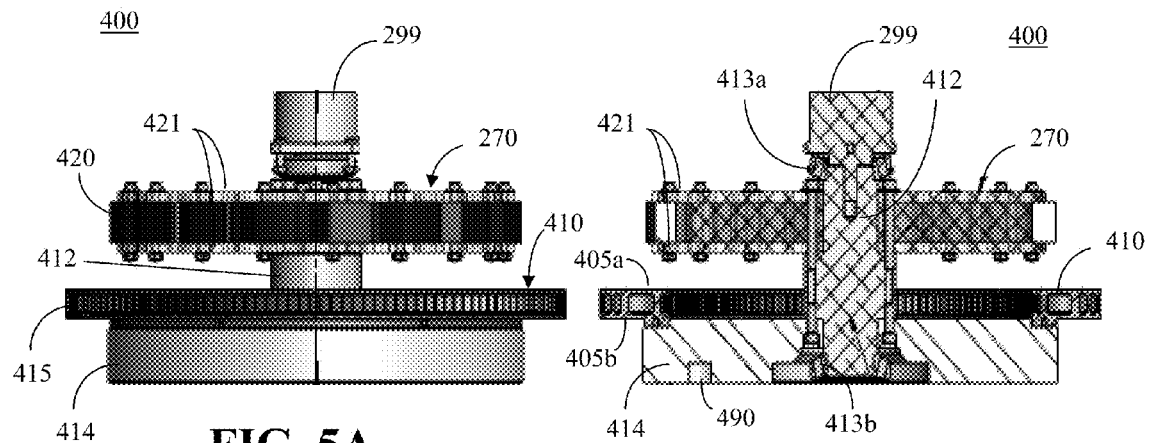
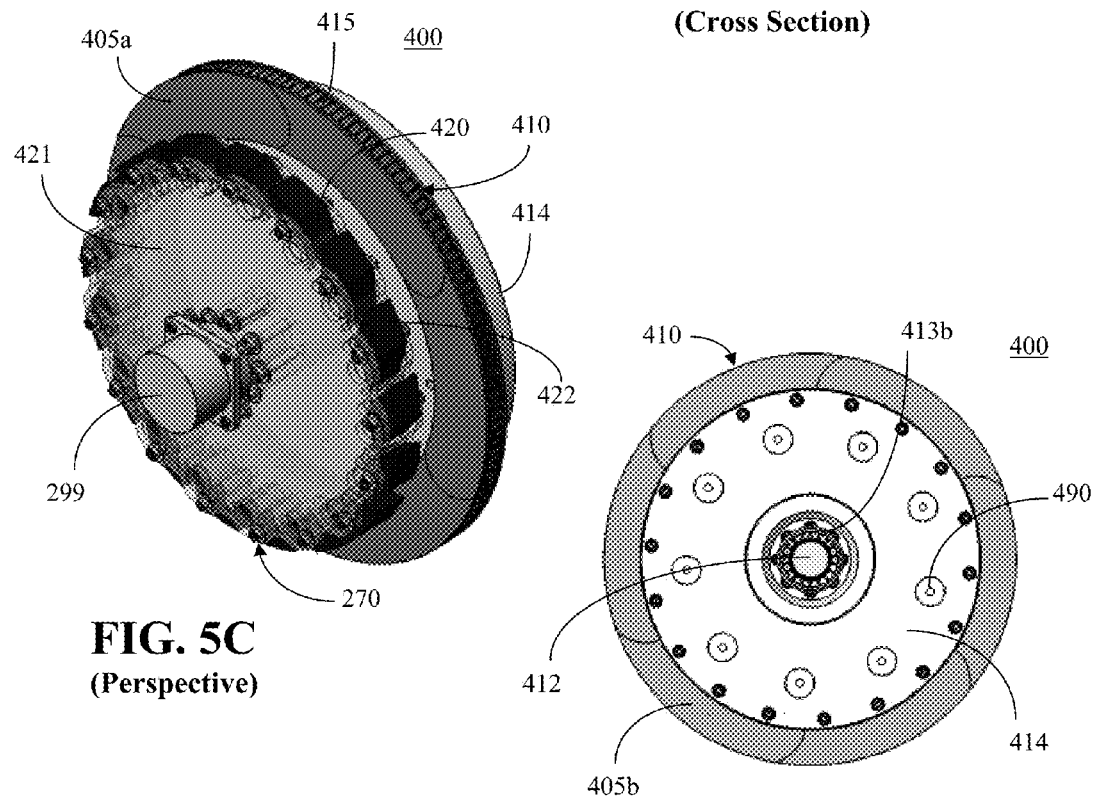

(Cross Section)

(Front View)

(Side View)

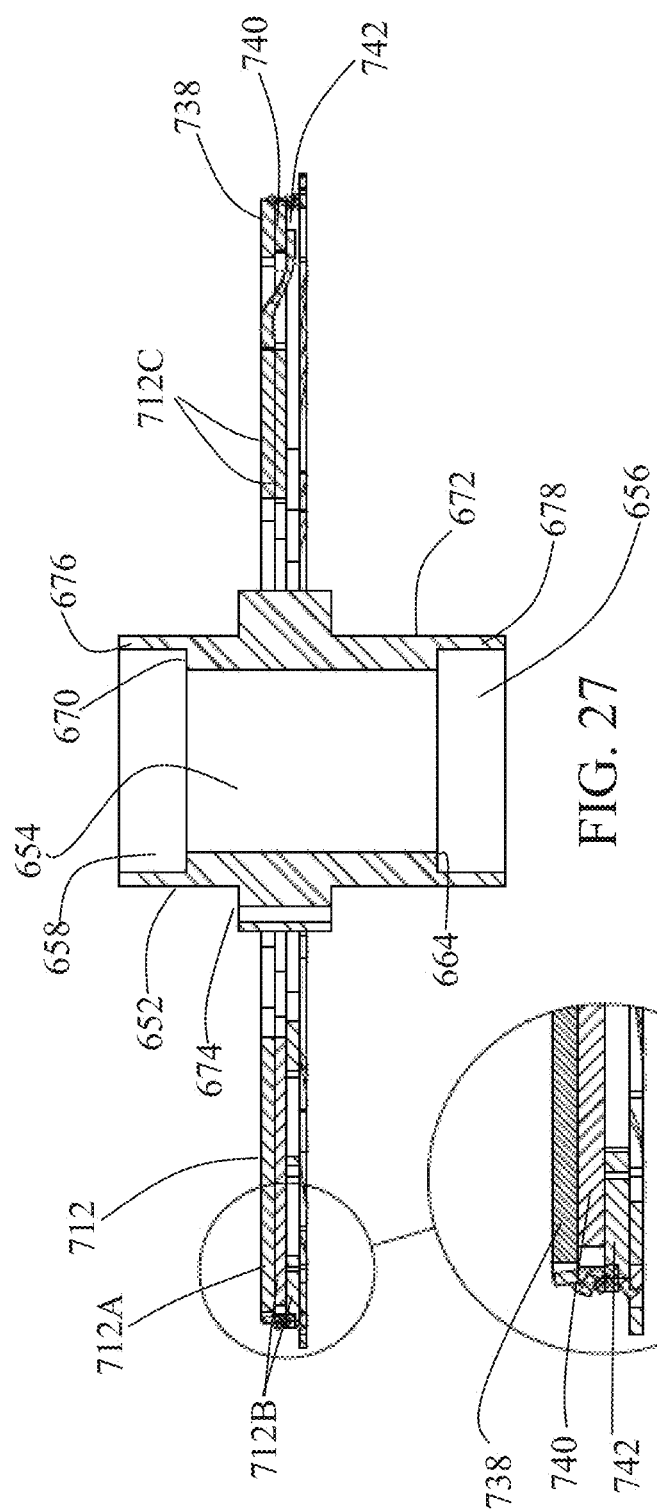

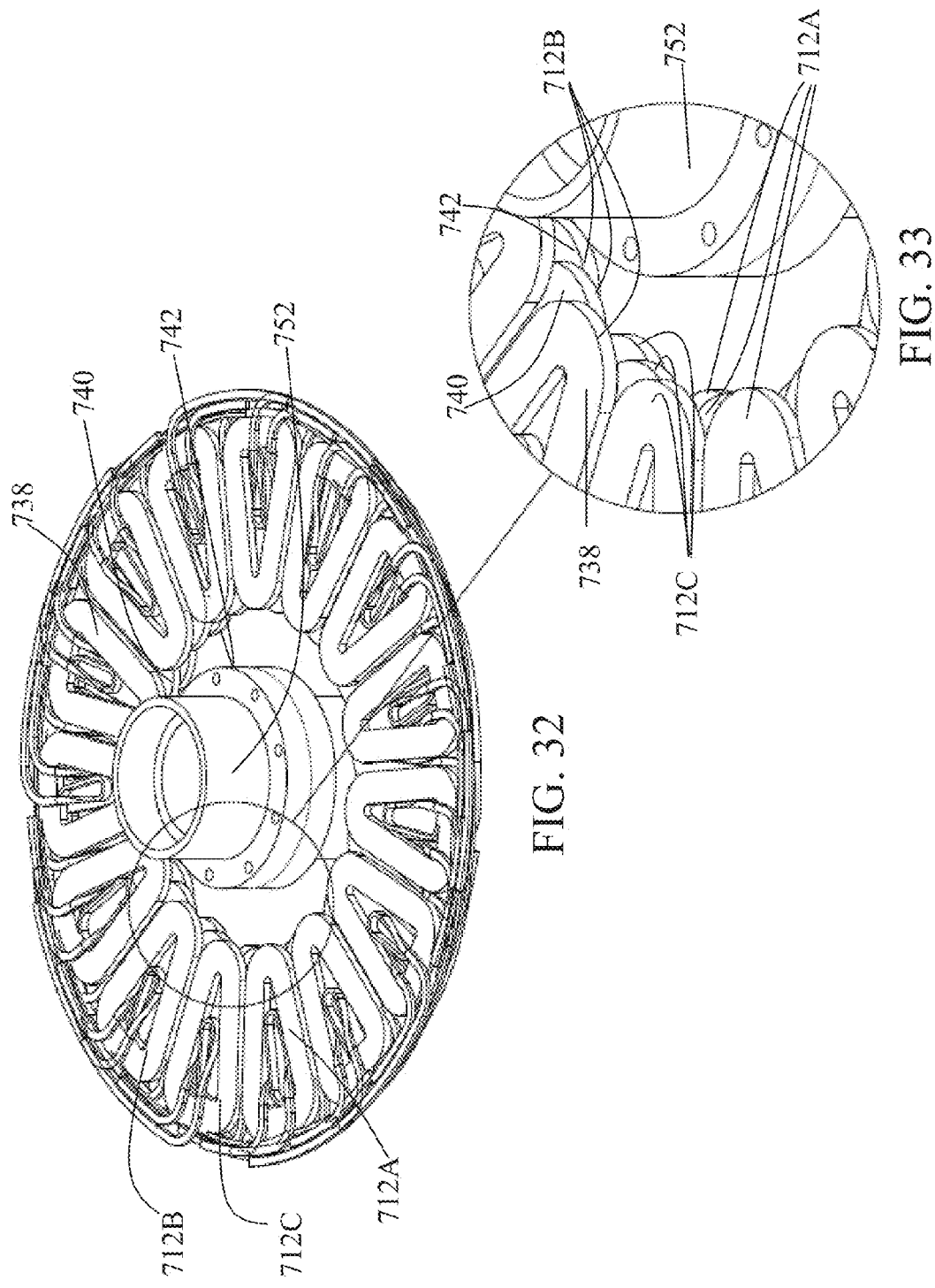

(Cross-section)

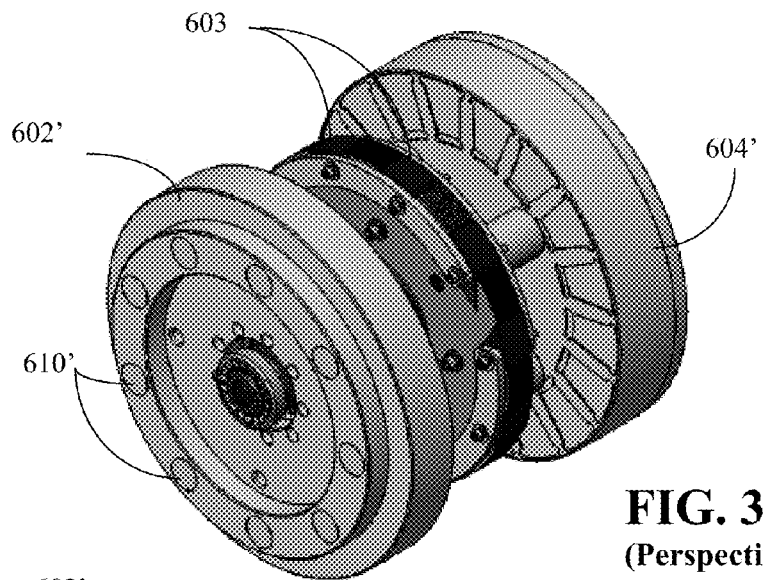
FIG. 36A
(Perspective)
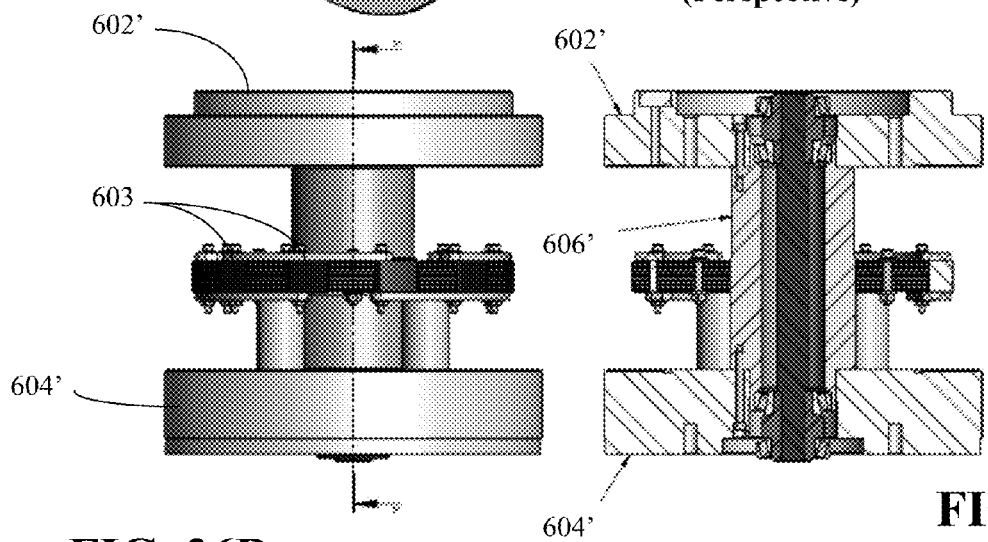
FIG. 36B
FIG. 36C
(Cross-section)
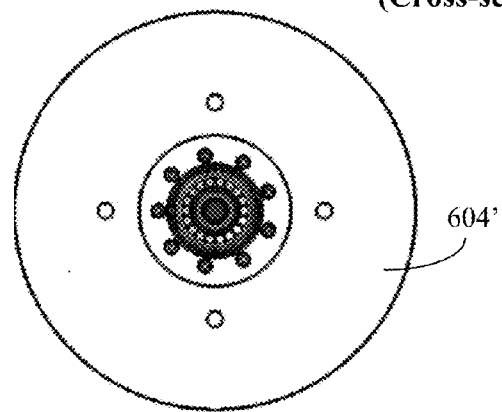
FIG. 36D
(Bottom View)

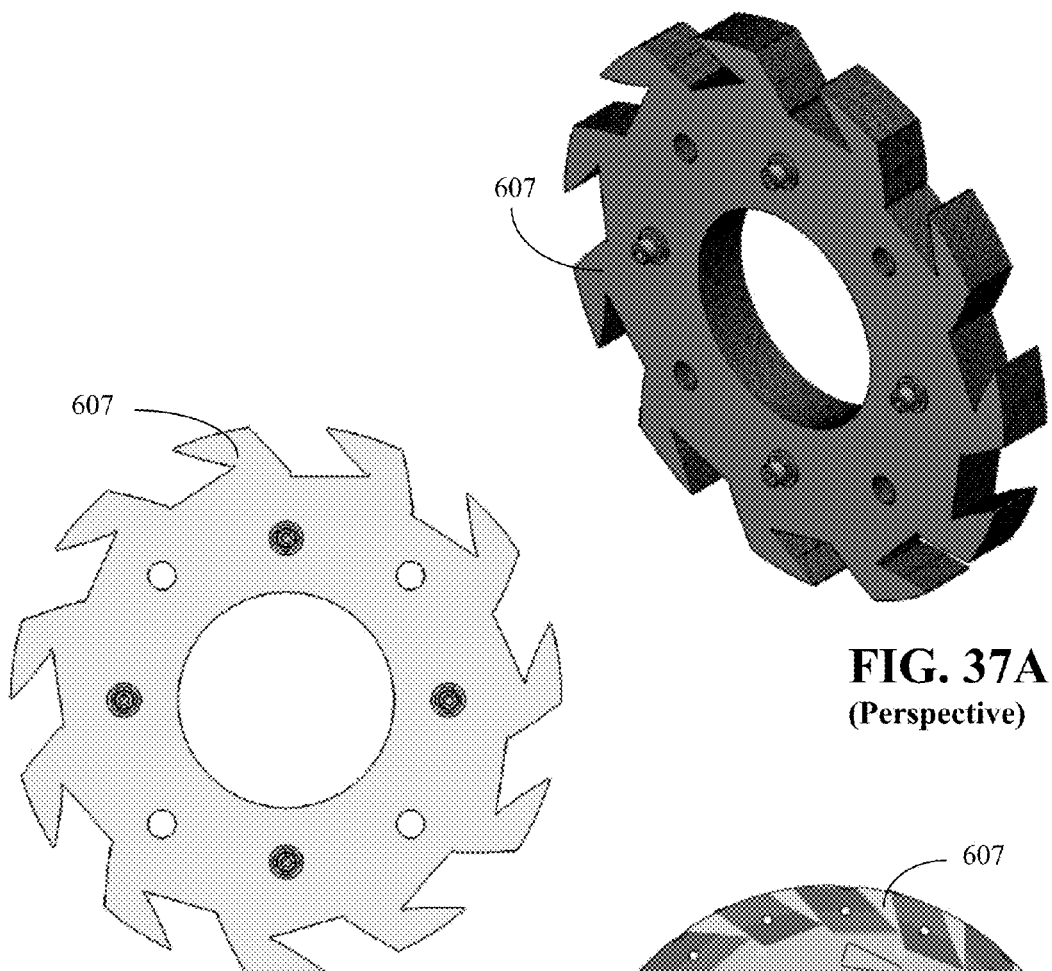
FIG. 37A
(Perspective)
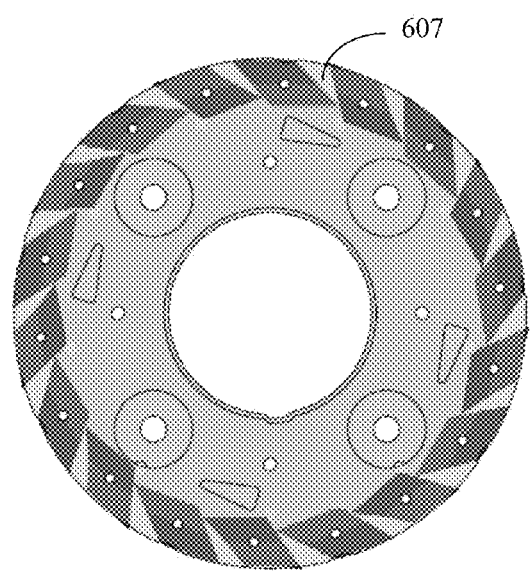
FIG. 37B
FIG. 37C
(Alternative)

TURBINE-GENERATOR DRIVEN BY COMPRESSED AIR AND MAGNET MOTOR

CROSS-REFERENCE TO RELATED APPLICATION

This application claims priority to U.S. Provisional Patent Application No. 61/489,022 filed May 23, 2011 and is also a continuation-in-part of co-pending U.S. patent application Ser. No. 12/954,012 filed Nov. 24, 2010, both of which are entitled "Turbine-Generator Systems and Methods," and both of which are hereby incorporated herein by reference in their entireties.

TECHNICAL FIELD

Embodiments of the present invention relate to turbine-generator systems and methods for controlling, using and optimizing turbine-generator systems.

BACKGROUND

Electrical generator systems in which a renewable energy, such as wind, solar, biomass, etc., is converted to electrical energy through an intermediate storage step are known in the art. For example, U.S. Pat. No. 3,806,733 discloses a wind driven electrical energy conversion apparatus in which the wind energy is converted to a pressurized air supply which is subsequently converted to rotary power by inflating air cells carried by an endless belt immersed in a tank filled with a fluid. The rotary output of the endless belt is connected to an electrical generator which produces the desired electrical power. U.S. Pat. No. 4,229,661 discloses a power plant for a camping trailer in which the wind energy is first converted to a pressurized air supply which is subsequently converted to a rotary output by an air driven turbine. The rotary output of the turbine is connected to a generator which produces the desired electrical power. U.S. Pat. No. 4,447,738 discloses a wind power electrical generator that includes a windmill mounted to a tower, an air compressor connected to the rotary output of the windmill, and an accumulator for storing the pressurized air output of the air compressor to generate a supply of pressurized air. A first air motor receives pressurized air from the accumulator to generate a rotary output, which drives an electrical generator to generate the desired electrical power. A waste air recovery mechanism includes a second air motor, which is driven by the exhaust of the first air motor to produce a rotary output supplementing the wind energy driving the air compressor.

The foregoing prior art systems are inefficient and are not capable of producing electric power on a large scale over a long period of time. Accordingly, there remains a need for a electric power generation system that can convert renewable energy to a long-term non-battery source of stored energy and then use that stored energy to generate electric power on a large scale over a long period of time.

SUMMARY

The present invention meets the above described need through novel turbine-generator systems and methods for controlling, using and optimizing turbine-generator systems. An exemplary turbine-generator system includes a power source connected to a compressor. The power source may be a solar panel, a wind turbine, sterling engine, a heat exchanger, or any other system or device for converting a renewable energy into mechanical power to drive the compressor. Accordingly, the renewable energy may be solar energy, wind, naturally occurring temperature differentials, energy produced from biomass or biofuel, etc. Compressed air output by the compressor is stored in one or more pressurized tanks connected thereto.

A turbine assembly is connected to the one or more pressurized tanks via one or more nozzles. The turbine assembly includes a turbine blade assembly and a turbine flywheel, each rotatably coupled to a shaft (i.e., the turbine blade assembly and a turbine flywheel may rotate around the shaft or the shaft itself rotate). The one or more nozzles are aligned with the turbine blades to deliver compressed air thereto. The compressed air injected onto the turbine blades may be preheated and/or pre-charged. The turbine assembly further includes a magnet motor for applying torque to the turbine flywheel.

The turbine assembly is coupled to a generator via a magnetic clutch. In certain embodiments, the generator comprises a generator casing that houses within its interior at least one generator flywheel rotatably coupled to a generator shaft and one or more conductive generator coils. Permanent magnets mounted to the at least one generator flywheel rotate in proximity to the at least one conductive coil to thereby generate electricity. The magnetic clutch may comprise a first plurality of clutch magnets fixed to a surface of the turbine flywheel that faces the generator flywheel and a second plurality of clutch magnets fixed to a surface of the generator flywheel that faces the turbine flywheel. Preferably, the interior of the generator casing is maintained in a vacuum.

The turbine-generator system also includes a control computer. The control computer is in communication with the magnet motor for selectably controlling its rotational speed. The control computer is also in communication with the nozzles for controlling the amount and timing of the compressed air injected onto the turbine blades. A load sensor is coupled to an output of the generator and is in communication with the control computer.

These and other aspects and features of the invention will be described further in the detailed description below in connection with the appended drawings and claims.

BRIEF DESCRIPTION OF THE FIGURES

FIG. 5A is a front view of a turbine flywheel assembly according to certain embodiments of the invention.

FIG. 5B is a front cross-sectional view of the turbine flywheel of FIG. 5A.

FIG. 5C is a perspective view of the turbine flywheel of FIG. 5A.

FIG. 5D is a bottom view of the turbine flywheel of FIG. 5A.

FIG. 27 is a cross-sectional view of the generator hub and the coils of the generator of FIG. 13 taken along line 22-22.

FIG. 28 is a partial cross-sectional view of the coils of FIG. 27.

FIG. 32 is a top perspective view of the generator hub and the coils of the generator of FIG. 13.

FIG. 33 is a partial perspective view of the generator hub and the coils of FIG. 32.

FIG. 36A-D are different views of internal components of the exemplary generator of FIG. 35A.

FIGS. 37A&B are view of an exemplary magnet holder for the generator of FIG. 35A according to certain embodiments.

FIGS. 37C is an illustration of an alternative magnet holder for the generator of FIG. 35A according to certain embodiments.

DETAILED DESCRIPTION

Figure 1:
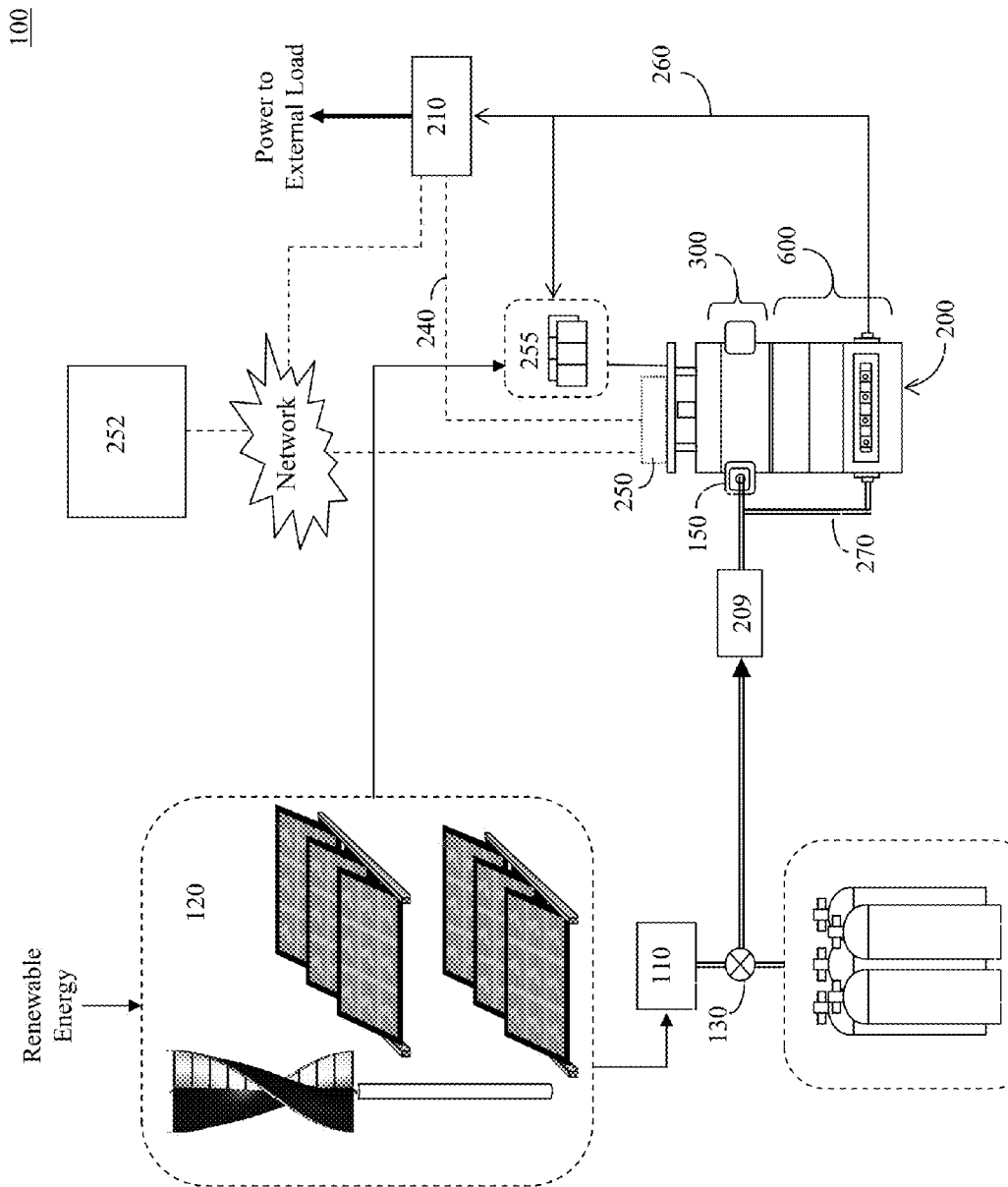
FIG. 1 is a schematic diagram of a power generation system 100 according to certain embodiments of the invention.

With reference to FIG. 1, a power generation system 100 according to certain embodiments of the invention includes a turbine-generator system 200, comprising a turbine assembly 300 and a generator 600. The turbine assembly 300 includes a turbine flywheel assembly that is driven at least partially by compressed air. Compressed air may be produced by a compressor 110 that is powered by one or more power sources 120. Preferably, the power source(s) 120 are driven by renewable energy, such as solar energy, wind, geothermal or other naturally occurring temperature differentials, biomass, biofuels, etc. Therefore, the power sources(s) 120 can include solar panels, wind turbines, sterling engines, heat exchangers and/or any other device or system for converting energy into mechanical power to drive the compressor 110. The power sources 120 could alternatively or additionally charge a battery system (not shown), which could discharge as necessary to operate the compressor 110. In other embodiments, the power sources 120 could alternatively or additionally be used to charge a battery array 255 that is used to power components of the turbine assembly 300.

Compressed air generated by the compressor 110 passes through a regulator 130 and is stored in one or more pressurized tanks 140 for later use and/or is passed to one or more selectably controllable nozzles 150 which, when opened, direct compressed air into the turbine assembly 300 to assist in spinning the turbine flywheel. A control computer 250 is in communication with the nozzles 150 for controlling the amount and timing of the compressed air injected onto the turbine assembly 300. The control computer 250 may be any suitable processor (i.e., CPU) driven computing device for executing computer-executable instructions for performing the control functions described herein. The turbine assembly 300 may also include a selectably controllable magnet motor for imparting additional torque to the turbine flywheel assembly. The turbine flywheel is coupled to a generator flywheel in the generator 600. In some embodiments this coupling is achieved by way of a magnetic clutch. Within the generator 600, permanent magnets mounted to one or more generator flywheel rotate in proximity to one or more conductive generator coil(s) to generate electricity 260.

A load sensor 210 may be coupled to the output of the generator 600, as a feedback system for sensing an increase or decrease in load and sending corresponding signals 240 to the control computer 250. Based on the monitored load, the control computer 250 controls the amount and timing of compressed air pulses provided from the nozzles 150 to the turbine assembly 300. The control computer 250 also controls the rotational speed of the magnet motor inside the turbine assembly 300. These actions will increase or decrease the torque applied to the turbine flywheel assembly and thus the rotational speed of the turbine flywheel. This in turn will cause the generator flywheel(s) to rotate at a faster or slower rate, resulting in the generation of additional or less power 260 to compensate for the increased or decreased load. The control computer 250 may be powered by on-board rechargeable batteries (not shown) and/or the external batteries 255.

In some embodiments, the control computer 250 may comprise an array of computers that are configured to communicate with each other. One such computer may be programmed with software and/or firmware (or other computer-executable instructions) for coordinating the operation of the nozzles 150 and the electromagnets of the magnet motor as needed to achieve or maintain a particular power output level from the turbine generator system 200. In other words, this computer may be responsible for determining the timing, sequence and duration of compressed air pulses output by the nozzles 150 and the timing, sequence and duration for activation, deactivation and polarity-switching of the electromagnets in the magnet motor. Another computer in the array may be programmed for receiving instructions regarding operation of the nozzles 150 and the electromagnets of the magnet motor and for controlling the nozzles 150 and electromagnets according to those instructions. Another such computer in the array may be programmed for communicating with the load sensor 210 and/or other remote device(s), such as a synchronization computer 252, via a wired or wireless network interface. The synchronization computer 252 may be programmed to synchronize the power output levels from multiple turbine generator systems 200 (e.g., load balancing).

In certain embodiments, it may be desirable to preheat and/or pre-charge the compressed air that is provided to the turbine assembly 300 via the nozzles 150. Hot air has a higher energy value than colder air, and can thus increase the efficiency of the turbine assembly 300. Likewise, electrostaticly charged air will form an electrostatic bond with the oppositely charged turbine blades, which will produce an electrostatic "Tsunami" effect on the turbine flywheel. An electrostatic charger 209 may be added to the compressed air delivery system, (either before the nozzles 150 as shown, or after the nozzles 150) to accomplish this pre-charging, i.e., to charge the compressed air particles with very high electrostatic voltage.

Figure 2A:
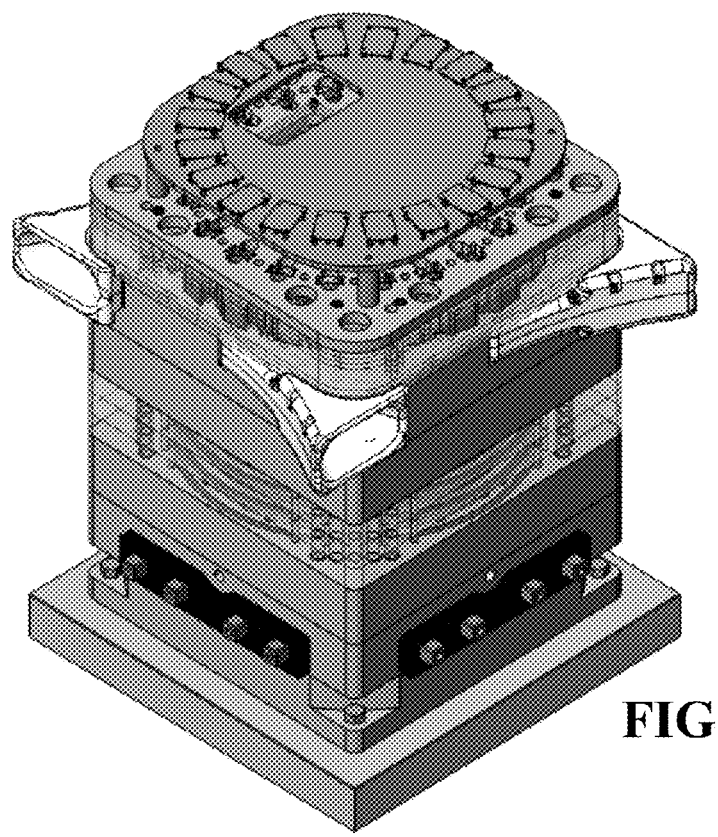
FIG. 2A is perspective view of a turbine-generator system according to certain embodiments of the invention.
Figure 2B:
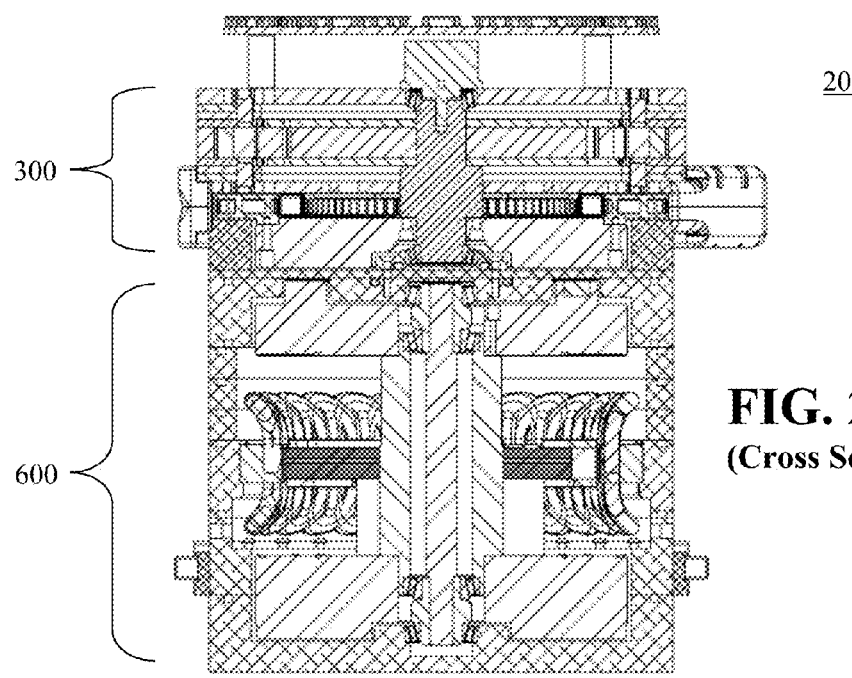
FIG. 2B is a front cross-sectional view of the turbine-generator system of FIG. 2A.
Figure 3A:
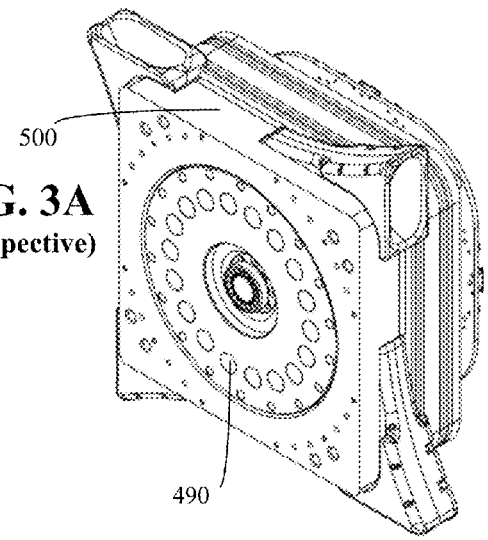
FIG. 3A is a perspective view of a turbine assembly according to certain embodiments of the invention.
Figure 3B:
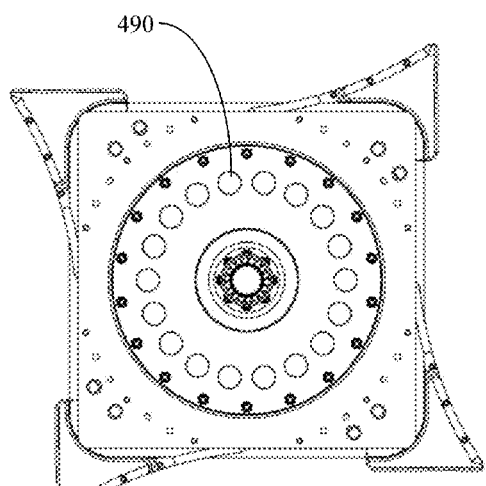
FIG. 3B is a bottom view of the turbine assembly of FIG. 3A.
Figure 3C:
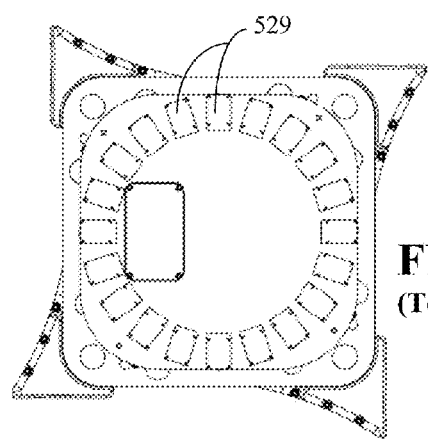
FIG. 3C is a top view of the turbine assembly of FIG. 3A.
Figure 4:
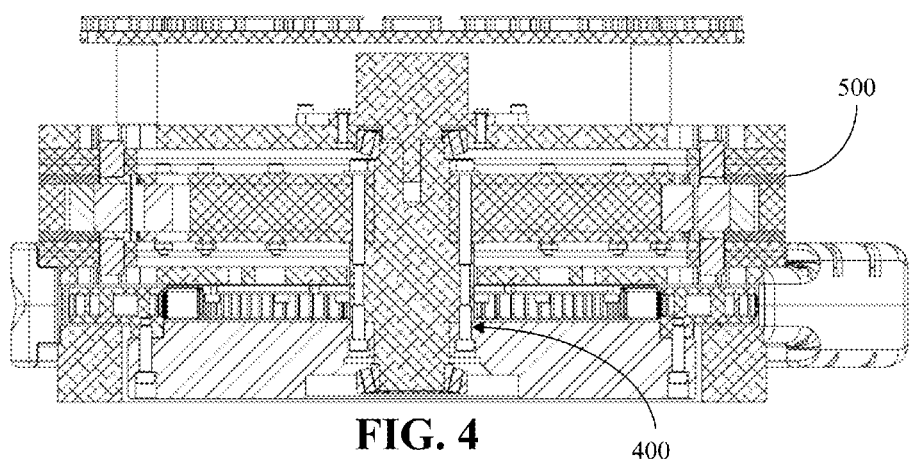
FIG. 4 is a front cross-sectional of the turbine assembly of FIG. 3A.

An exemplary turbine-generator system 200 according to certain embodiments is shown in FIGS. 2A and 2B. The turbine assembly 300 of the exemplary turbine-generator system 200 is shown in FIGS. 3A-D and the components and operation thereof are described with reference to FIGS. 3-12. Various embodiments of the generator 600, 600' of the exemplary turbine-generator system 200 are shown in and described with reference to FIGS. 13-38.

The Turbine

The exemplary turbine assembly 300 has a turbine casing 500 (see FIGS. 3 and 4), which houses a turbine flywheel assembly 400 and other components. The turbine casing 500 can be formed of any suitable material, including but not limited to polypropylene, aluminum, acrylonitrile-butadiene-styrene ("ABS"), ABS+ (ABS plus, a form of ABS having higher temperature resistance), polylactic acid, mild steel (such as A36 mild steel), and acetal (such as Delrin®, available from DuPont). In some embodiments, the turbine casing 500 is formed from a polypropylene co-polymer.

The turbine casing 500 houses a turbine flywheel assembly 400. As shown in FIGS. 5A-D, the turbine flywheel assembly 400 includes a shaft 412, a turbine flywheel 414 rotatably coupled to the shaft 412, one or more turbine blade assemblies 410 (see also FIG. 6) mounted to the turbine flywheel 414, and a magnet motor rotor assembly 270 coupled to the shaft 412. The turbine flywheel 414, turbine blade assemblies 410 and magnet motor rotor assembly 270 may be rotatably connected to the shaft 412 using a pair of bearings 413a&b. An absolute position encoder 299 may also be mounted to the top end of the shaft 412. The turbine flywheel 414 and the shaft 412 are preferably formed from material(s) that can withstand the requisite operating rotational speeds without failing but that is/are also lightweight to minimize the required starting and operating torques of the turbine flywheel assembly 400. Suitable materials include, but are not limited to, polypropylene, aluminum, ABS, ABS+, polylactic acid, mild steel (such as A36 mild steel), and acetal (such as Delrin®). In some embodiments, the turbine flywheel 414 and the shaft 412 are formed from A36 mild steel.

In some embodiments, the turbine blade assembly 410 comprises a ring of turbine blades 415 sandwiched between solid top and bottom surfaces 405a&b. A turbine blade assembly can be of a single-piece construction or a multiple-piece construction. Accordingly, it may be preferable to extrude or mold turbine blade assembly 410 (or component thereof) from a lightweight, high strength material such as, but not limited to, polypropylene, aluminum, ABS, ABS+, polylactic acid, mild steel (such as A36 mild steel), and acetal (such as Delrin®). In the illustrated embodiment, the turbine blade assembly 410 is constructed from six substantially identical segments.

Figure 6:
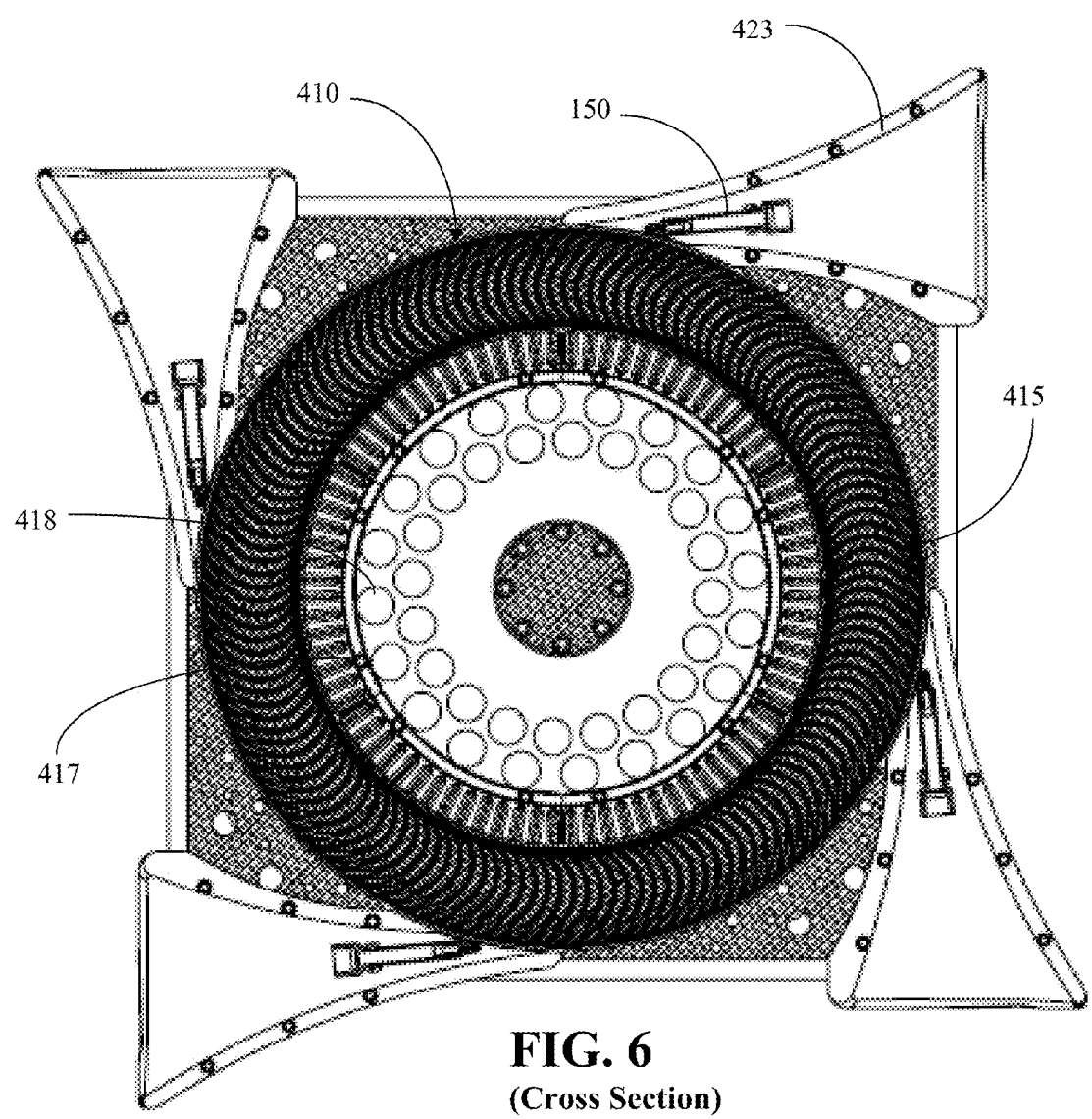
FIG. 6 is a bottom cross-sectional view of a turbine assembly according to certain embodiments of the invention.

An exemplary turbine blade assembly 410 is shown in further detail with reference to FIG. 6, which is a cross-sectional, bottom view of the turbine assembly 300. As discussed, the turbine blade assembly 410 is mounted to the turbine flywheel 414 (not shown in FIG. 6) and thus rotates around or with the shaft 412. As the turbine blade assembly 410 rotates, the outer edges of the turbine blades 415 pass in close proximity to the nozzles 150, which may be inserted into the turbine casing 500. Compressed air pulses from the nozzles 150 impart force to the turbine blades 415, thus rotating the turbine blade assembly 410. In some embodiments, stationary vanes 417 may be positioned on the inside of the turbine blade assembly 410, so as to impart additional force on the turbine blade assembly 410 as compressed air passes through and exits the turbine blades 415. The stationary vanes 417 are not coupled, directly or indirectly to the shaft 412 so that they do not rotate with the turbine blade assembly 410. Vent holes 418 in the top of the turbine casing 500 allow the compressed air to exit the turbine casing 500 after it exits the turbine blades 415 and interacts with the stationary vanes 417. As described, the control computer 250 is connected to the nozzles 150 and controls amount and timing of the compressed air injected onto the turbine blades 415.

The nozzles 150 may optionally be positioned within air amplification funnels 423, which amplify the pressure of the pulses generated by the nozzles. In some embodiments, the air amplification funnels 423 and nozzles 150 are positioned in each corner of the turbine casing 500. In other embodiments, the air amplification funnels 423 and nozzles 150 may be at other positions along one or more sides of the turbine casing 500.

With reference again to FIG. 5A-C, the magnet motor rotor assembly 270 comprises a plurality of permanent magnets 420 (hereinafter referred to as "rotor permanent magnets) and one or more support plates 421. In some embodiments, the rotor permanent magnets 420 are sandwiched between two support plates 421, which may be formed from polycarbonate or acrylic. The rotor permanent magnets 420 are configured to interact with stator magnet assemblies 510 of a magnet motor stator assembly 505 that is also housed within the turbine casing 500 (described below with reference to FIGS. 7-12) to provide torque to the shaft 412 and assist in maintaining or controlling the rotational speed of the turbine flywheel 414.

The rotor permanent magnets 420 are arranged in a ring around the shaft 412. Each of the rotor permanent magnets 420 is axially magnetized. The rotor permanent magnets 420 are arranged on support plates 421 so that the same pole of each magnet faces outward. In some embodiments, the north pole of each of the rotor permanent magnets 420 faces outward (away from the shaft 412). The rotor permanent magnets 420 are preferably formed of neodymium or other similar magnetic material with a similar magnetic strength. In some embodiments, the rotor permanent magnets 420 are formed of N52 neodymium, which is the highest grade of neodymium magnet currently available.

Figure 7:
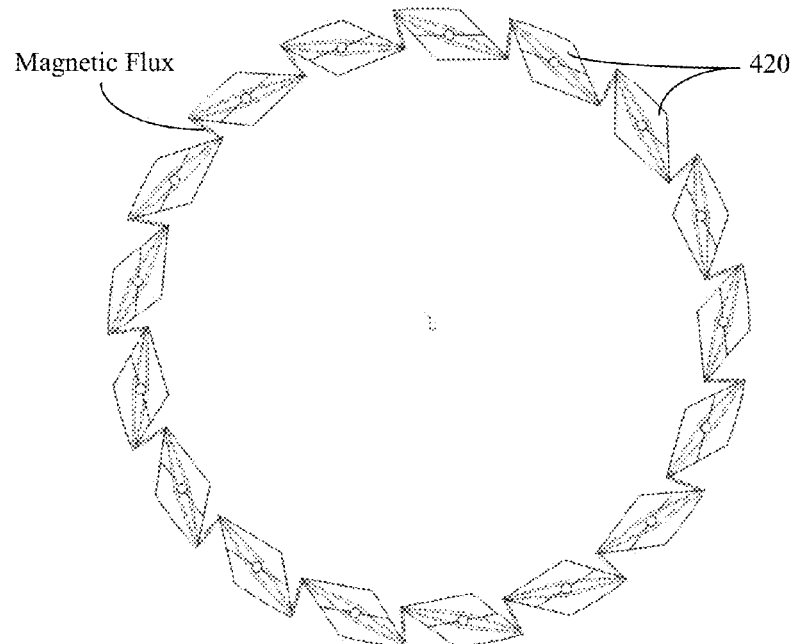
FIG. 7 is an illustration of the magnetic flux generated by permanent magnets in an exemplary magnet motor rotor assembly.

In some embodiments, rotor permanent magnets 420 are substantially parallelogram-shaped, except that the outer edge 422 of each rotor permanent magnet 420 may be curved so that the plurality of rotor permanent magnets 420 collectively conform to the shape of a circle when arranged on the support plates 421. The shape and arrangement of the rotor permanent magnets 420 in such embodiments results in a "saw tooth" magnetic flux pattern 531, as illustrated in FIG. 7.

Figure 8:
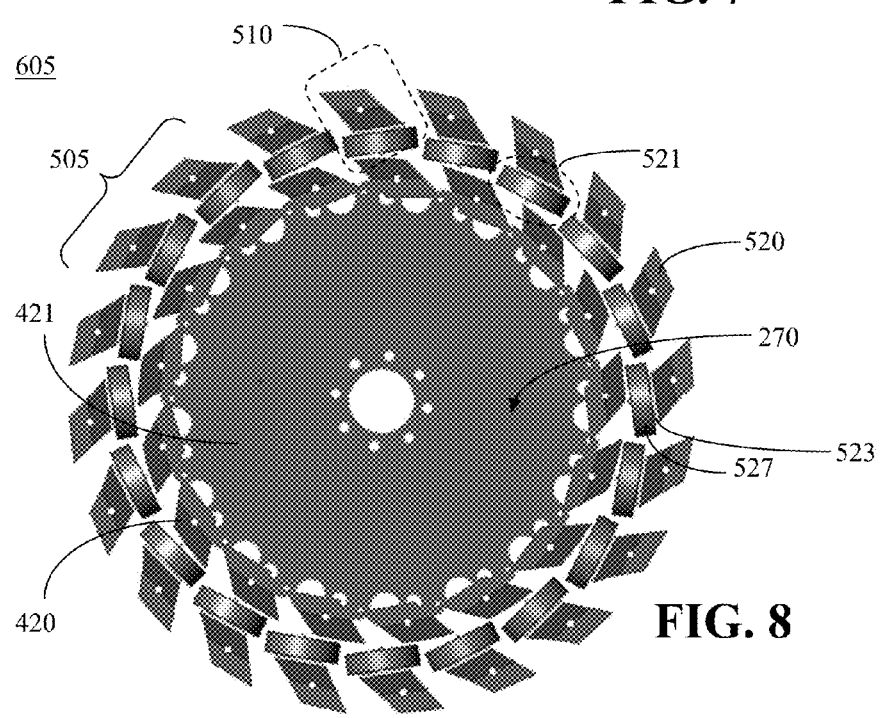
FIG. 8 is an illustration of an exemplary magnet motor according to certain embodiments of the invention.
Figure 9:
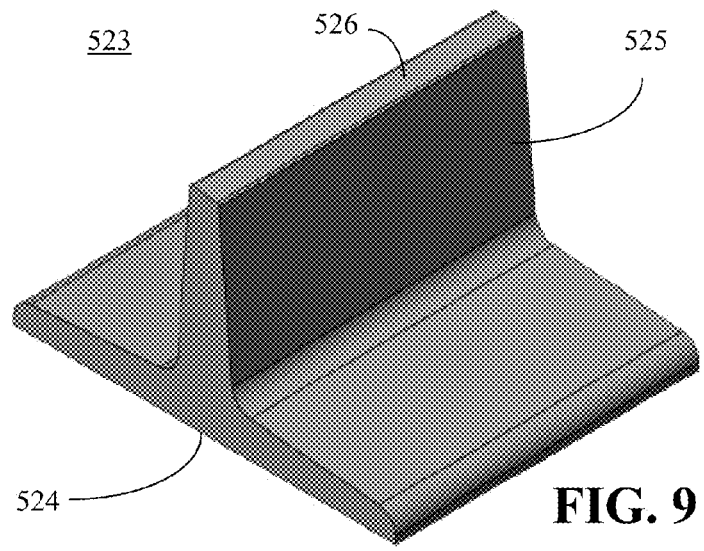
FIG. 9 is a perspective view of an exemplary core of an electromagnet according to certain embodiments of the invention.
Figure 10A:
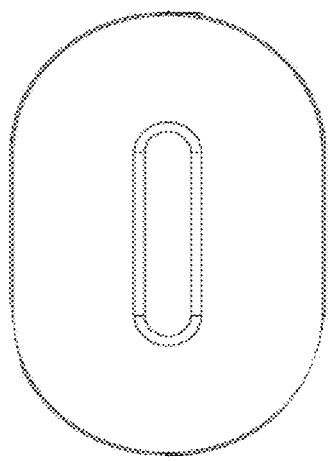
FIG. 10A is a front view of an exemplary coil of an electromagnet according to certain embodiments of the invention.
Figure 10B:
FIG. 10B is a side view of the exemplary electromagnet coil of FIG. 10A.
Figure 11:
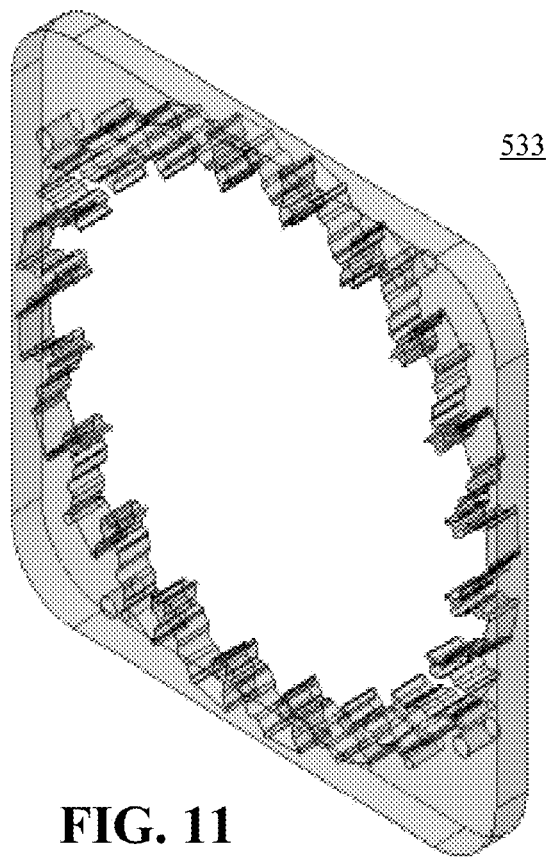
FIG. 11 is a perspective view of an exemplary support plate for a magnet motor stator assembly according to certain embodiments of the invention.
Figure 12:
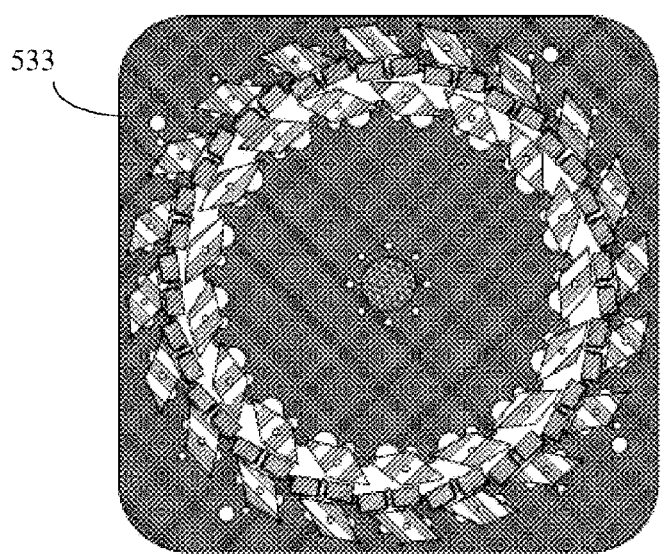
FIG. 12 is an illustration of an exemplary magnet motor according to certain embodiments of the invention.
Figure 13:
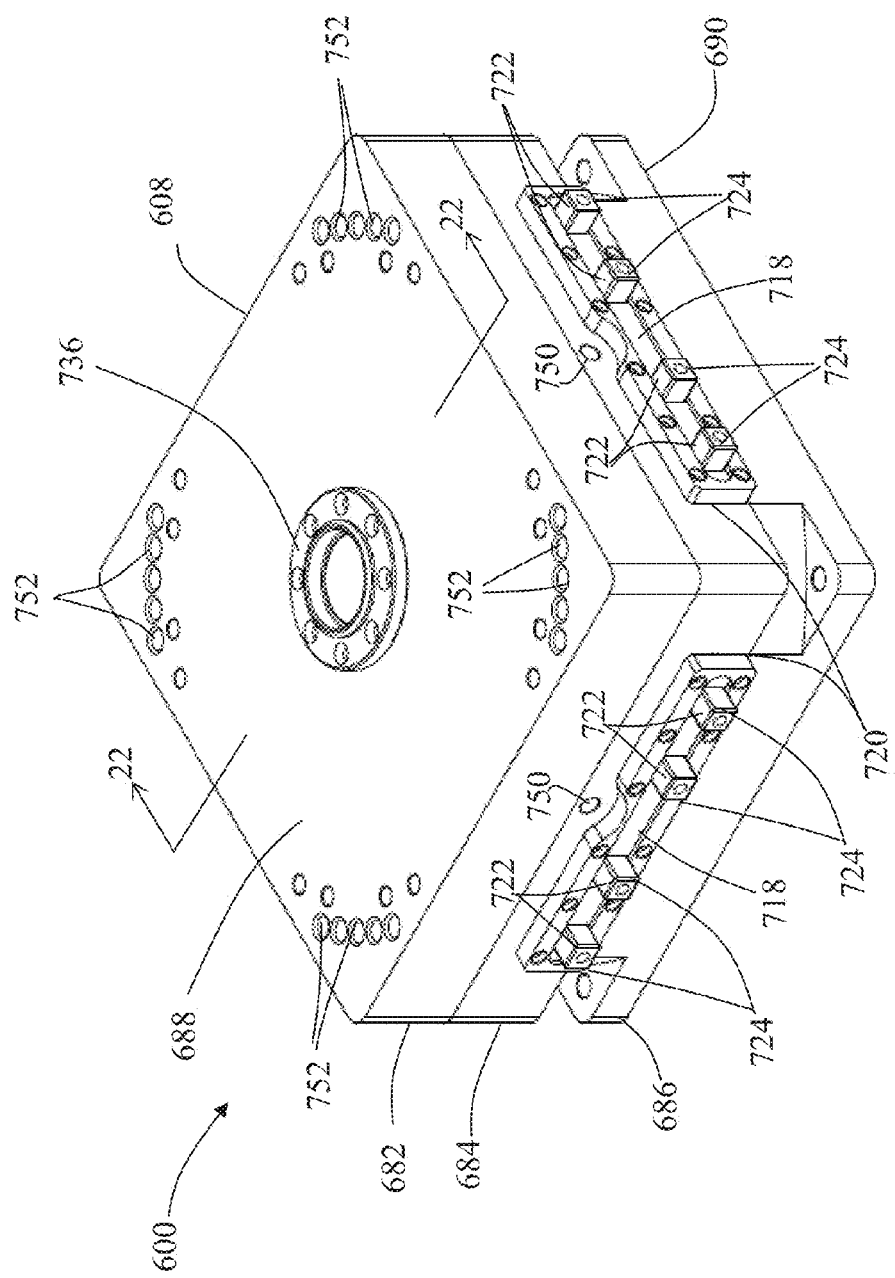
FIG. 13 is a perspective view of a generator according to certain embodiments of the invention.
Figure 14:
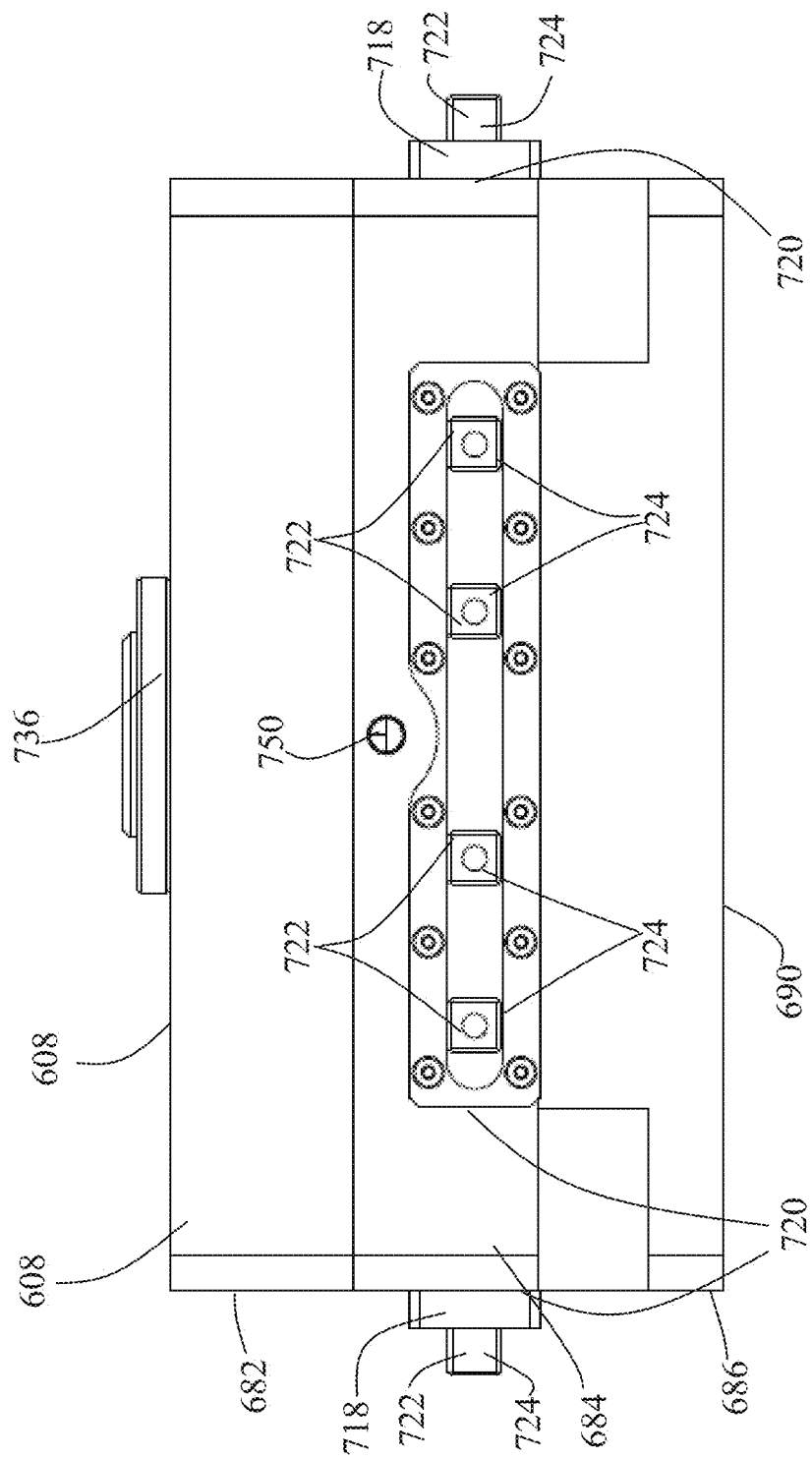
FIG. 14 is a front view of the generator of FIG. 13.

FIG. 8 illustrates the configuration of an exemplary magnet motor 605, comprising a magnet motor rotor assembly 270 and a magnet motor stator assembly 505. The magnet motor stator assembly 505 comprises a plurality of stator magnet assemblies 510 arranged in a ring surrounding the magnet motor rotor assembly 270. Each of the stator magnet assemblies 510 comprises a permanent magnet 520 (hereinafter referred to as a "stator permanent magnet") and an electromagnet 521 (hereinafter referred to as a "stator electromagnet"). In the illustrated embodiments, the magnet motor stator assembly 505 includes twenty magnet assemblies 510 and the magnet motor rotor assembly includes 17 rotor permanent magnets. The stator magnet assemblies 510 of the magnet motor stator assembly 505 are held in place using one or more stationary support plates. An exemplary support plate 533, which may be formed from acrylic or another suitable material, is shown in FIGS. 11 and 12.

Each stator permanent magnet 520 is axially magnetized. The stator permanent magnets 520 are arranged on or within one or more support plates 533 so that the same pole of each magnet faces inward. In some embodiments, the north pole of each of the stator permanent magnets 520 faces inward (towards the magnet rotor stator assembly 270). The stator permanent magnets 520 are preferably formed of neodymium or other similar magnetic material with a similar magnetic strength. In some embodiments, the stator permanent magnets 520 are formed of N52 neodymium, which is the highest grade of neodymium magnet currently available. In some embodiments, stator permanent magnets 520 are substantially parallelogram-shaped.

Each stator electromagnet 521 comprises a conductive coil 527 (see also FIGS. 10A&B), which may be copper coil, wrapped around a core 523. The conductive coil 527 may be coated with a heat-resistant coating. The core 523 may be made from any suitable ferromagnetic material, such as iron or mild steel. The core 523 (see FIG. 9) may have a substantially flat surface 524 that may be generally perpendicular to a post portion 525. The conductive coil 527 is wrapped around the post portion 525.

Within each stator magnet assembly 510, the inward-facing surface of the stator permanent magnet 520 is coupled to the substantially flat surface 524 of the core 523 of the electromagnet 521. In such a configuration, when the conductive coil 527 is not energized, the magnetic flux of the stator permanent magnet 520 passes through the substantially flat surface 524 of the core 523 and extends from the post portion 525 of the core 523. Thus, the post portion 525 is magnetized with the same polarity as the stator permanent magnet 520. In some embodiments, the tip 526 of the post portion 525 is slightly angled so as to conform to the curvature of the magnet motor rotor assembly 270.

Each stator electromagnet 521 may be energized by supplying current to the conductive coil 527. Each stator electromagnet 521 can be wired to an electromagnet controller 529 (see FIG. 3C), which may be part of or controlled by the control computer 250 (see FIG. 1). In exemplary embodiments, there is one electromagnet controller 529 for every stator electromagnet 521. Each electromagnet controller 529 may be a printed circuit board ("PCB"), but could also be another suitable structure with one or more PCB mounted thereon. Each electromagnet controller 529 includes circuitry and logic (e.g., a CPU for executing computer-executable instructions for performing the control functions described herein) for activating/deactivating and changing the direction of the current supplied to the conductive coil 527 of the corresponding stator electromagnet 521, thus selectively activating/deactivating and polarity-switching the stator electromagnet 521.

In some embodiments, power for the electromagnet controllers 529 and the stator electromagnets 521 can be drawn from external batteries 255 (see FIG. 1) or one or more other power source. In other embodiments, a battery or bank of batteries (not shown), may be located on or within the turbine casing 500 for powering the electromagnet controllers 529 and/or the stator electromagnets 521. In some embodiments, the batteries used to power the various components of the turbine generator assembly 200 are rechargeable lithium-ion batteries. Other suitable types of rechargeable batteries may also be used.

The stator electromagnets 521 of the magnet rotor stator assembly 505 are activated/deactivated/polarity-switched in a controlled sequence in order to cause rotation of the magnet motor rotor assembly 207. As described, the post portion 525 of each stator electromagnet 521 in the magnet motor stator assembly 505 has the same magnetic polarity as the stator permanent magnet 520 to which it is coupled, when the stator electromagnet 521 is not energized. Thus, the post portion 525 of each stator electromagnet 521 facing inward toward the magnet motor rotor assembly 270 has the same magnetic pole (e.g. north) as that of the outer edge 422 of each rotor permanent magnet 420 in the magnet motor rotor assembly 270. In this configuration, when the stator electromagnet 521 is not energized, the post portion 525 of the stator electromagnet 521 and the nearest rotor permanent magnet 420 of the magnet motor rotor assembly 270 exert a repulsive force on each other.

When a stator electromagnet 521 is energized with current running through the conductive coil 527 in a first direction e.g., positive to negative or vice versa (depending on the polarity of the stator permanent magnet 520), the magnetic force of the post portion 525 is amplified, which results in an increase in the repulsive force between the post portion 525 and the nearest rotor permanent magnet 420. When the stator electromagnet 521 is energized with current running through the conductive coil 527 in the opposite direction, the magnetic force of the post portion 525 is attenuated, which results in a decrease of the repulsive force between the post portion 525 and the nearest rotor permanent magnet 420.

Increasing or decreasing the amperage of the current running through the conductive coil 527 in the first direction will increase or decrease the magnetic amplification effect. Increasing or decreasing the amperage of the current running through the conductive coil 527 in the opposite direction will increase or decrease the magnetic attenuation effect (with a sufficient increase eliminating or substantially eliminating the magnetic force of the post portion 525). Energizing adjacent stator electromagnets 521 in opposite directions relative to each other (i.e., one amplifying the magnetic power of its post portion 525 and the other attenuating the magnetic power of its post portion 525) in a timed sequence, will thus cause the magnet motor rotor assembly 270 to rotate. By precisely controlling the timed sequence as well as the amperage of the current supplied to each stator electromagnet 521 (i.e., using electromagnet controllers 529), the rotational speed of the magnet motor rotor assembly 270 can be selectably controlled.

The stator electromagnets 521 may also be deactivated at selected times when the magnet motor rotor assembly 270 is rotating, which causes them to function as electric generators and accumulate small charges. For example, one or more stator electromagnet 521 may be deactivated (i.e., no current is supplied to the conductive coil 527) for a period of time when the load on the turbine-generator system 200 is decreased or the magnet motor rotor assembly 270 is otherwise decelerating. The small electric charges (pulses) generated by the electromagnets 521 can be used, for example, to trickle charge batteries that power the electromagnet controllers 529 or even the external batteries 225.

In order to precisely control the rotational speed of the turbine flywheel assembly 400, it is necessary for the control computer 250 to precisely track the rotational position of at least one point on the turbine flywheel 414 relative to the generator casing 500 in real time, as the turbine flywheel 414 rotates. For example, the control computer 250 will need to know (or be provided with data for calculating) the position of each of the rotor permanent magnets 420 relative to the stator electromagnets 521, so that the exact times for activating/deactivating/polarity switching the stator electromagnets 521 can be determined. Similarly, the control computer 250 will need to know (or be provided with data for calculating) the position of each turbine blade 415 relative to the nozzles 150, so that exact times for opening/closing the nozzles 150 can be determined. The control computer 250 can also be configured to determine, or may be provided with data indicating, the rotational speed of the turbine flywheel 414 based on detected changes in its rotational position. Based on the rotational speed of the turbine flywheel 414, the control computer 250 can selectably control the magnet motor 605 and the nozzles 150.

In some embodiments, the absolute position of the turbine flywheel 414 can be tracked with extreme precision using an absolute position magnetic encoder chip (not illustrated). An exemplary magnetic encoder chip is the AM4096 chip, available from RLS®. Within the miniature chip is the processing circuitry to provide outputs in absolute SSI, incremental, linear voltage, tacho and UVW formats with resolutions to 12 bit. The zero position can also be selected at point of installation. The encoder integrated circuit senses the position of a diametrically polarized magnet that rotates proximate to the chip. As the magnet rotates an array of Hall sensors within the chip produces a voltage representation of the magnetic field distribution. Subsequent internal processing is then used to produce the required output signal format and resolution. In some embodiments, one of the magnetic encoder chip and the diametrically polarized magnet is mounted to the turbine flywheel 414 and the other is mounted to the turbine casing 500, such that the one rotates relative to the other. The magnetic encoder chip can be connected to the control computer 250 to provide positional data and/or rotational speed data to the control computer 250. In other embodiments, precise positional tracking of the turbine flywheel 414 could be achieved using an absolute position encoder 299 (e.g., the HD25A encoder, available from U.S. Digital). In still other embodiments, precise positional tracking of the turbine flywheel 414 could be achieved using an optical reader assembly. Any such means for tracking the absolute position of at least one point on the flywheel as it rotates can be connected to or otherwise in communication with the external control computer 250 and powered by the external batteries 255 and/or one or more other power source.

In some embodiments, the turbine assembly 300 and generator 600, 600' may be coupled to each other by a magnet clutch. In particular, the turbine flywheel 414 may be magnetically coupled to a generator flywheel 602 of the generator 600, 600' (described below). This is accomplished, in part, by embedding a plurality of turbine clutch magnets 490 in the base of the turbine flywheel 414 (see FIGS. 3 and 5). The turbine clutch magnets 490 may be axially magnetized and may be are arranged in the base of the turbine flywheel 414 so that the same pole of each magnet faces outward, or so that opposite poles of each adjacent magnet face outward. As will be described below, the turbine clutch magnets 490 are magnetically coupled to a complementary plurality of generator clutch magnets 610 positioned on a generator flywheel 602 (see FIG. 24), i.e., the turbine clutch magnets 490 and generator clutch magnets 610 are attracted to one another. Rotation of the turbine flywheel assembly 400 thus causes the turbine clutch magnets 490 to pull the generator clutch magnets 610, thus causing the generator flywheel 602 to rotate accordingly.

The turbine clutch magnets 490 and generator clutch magnets 610 are formed of neodymium or other similar magnetic material with a similar magnetic strength. In some embodiments, the turbine clutch magnets 490 and generator clutch magnets 610 are formed of N42 neodymium. Thus, in some embodiments, the turbine flywheel assembly 400 and generator flywheel 602 are not mechanically coupled to one another, rather, they are connected by a magnetic clutch. By magnetically coupling the turbine flywheel assembly 400 and generator flywheel 602 in this manner, the interior of the generator 600, 600' can be sealed and maintained in a vacuum, which reduces friction within the generator 600, 600'. Maintaining a vacuum within the generator 600, 600' also reduces electrical noise due to static electricity from air in the generator 600, 600'.

The Generator

An exemplary generator 600 is shown in FIGS. 13-34. As shown in FIGS. 22-26, the generator 600 includes an upper generator flywheel 602, a lower generator flywheel 604, a generator shaft 606, and a generator casing 608. The upper generator flywheel 602 has a substantially circular shape. The upper generator flywheel 602 may be formed of materials including but not limited to polypropylene, aluminum, ABS, ABS+, polylactic acid, mild steel (such as A36 mild steel), and acetal (such as Delrin®). In one embodiment, the upper generator flywheel 602 is formed from A36 mild steel.

The upper generator flywheel 602 includes a plurality of generator clutch magnets 610 positioned on an outer surface 616. In the embodiment best illustrated in FIGS. 24 and 34, each generator clutch magnet 610 has a circular shape, but one of skill in the art will understand that any suitable shape may be used including but not limited to rectilinear, parabolic, trapezoidal, and oval. The plurality of generator clutch magnets 610 are formed of neodymium or other similar magnetic material with a similar magnetic strength. In some embodiments, the plurality of generator clutch magnets 610 are formed of N42 neodymium.

The plurality of generator clutch magnets 610 may be positioned within a raised ring 618 that is positioned on the outer surface 616. In other embodiments, the plurality of generator clutch magnets 610 may be positioned flush with the outer surface 616. In the embodiment best illustrated in FIGS. 15 and 34, the plurality of generator clutch magnets 610 may be placed within recesses 611 of the raised ring 618. The recesses may be arranged in a consistent pattern around the raised ring 618. The generator clutch magnets 610 may be secured to the raised ring 618 using any suitable adhesive, preferable an adhesive that can withstand the high temperatures that will be present inside the generator 600 during operation.

As mentioned, the generator clutch magnets 610 may be arranged so that the same pole of each magnet faces upward or so that opposite poles of adjacent magnets face upward (depending on how the turbine clutch magnets 490 are arranged). The plurality of generator clutch magnets 610 are thus arranged to magnetically attract the similarly arranged turbine clutch magnets 490 located in the turbine flywheel 414 of the turbine flywheel assembly 400. However, one of skill in the relevant art will understand that any appropriate arrangement of the plurality of generator clutch magnets 610 may be used.

Figure 16:
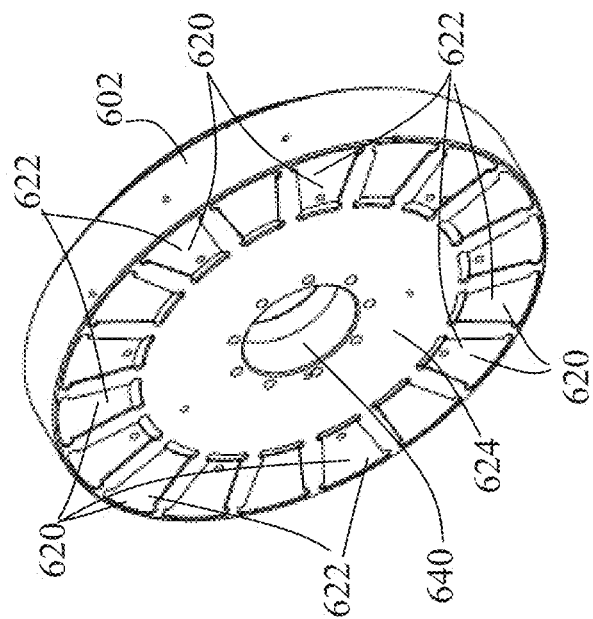
FIG. 16 is a bottom perspective view of the top flywheel of FIG. 15.
Figure 15:
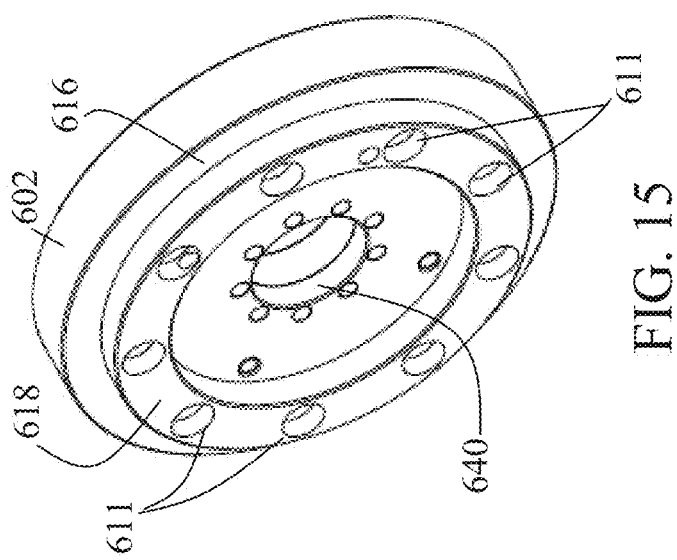
FIG. 15 is a top perspective view of a top flywheel of the generator of FIG. 13.
Figure 18:
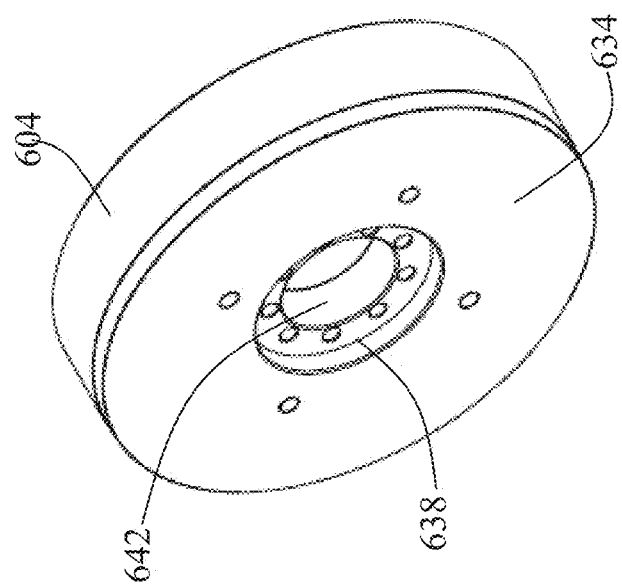
FIG. 18 is a bottom perspective view of the bottom flywheel of FIG. 17.

In the embodiment best illustrated in FIG. 16, the upper generator flywheel 602 also includes a plurality of generator coupling magnets 620 positioned on an inner surface 624. In some embodiments, such as the example illustrated in FIG. 16, the each generator coupling magnet 620 has a trapezoidal shape, but one of skill in the relevant art will understand that any suitable shape may be used including but not limited to rectilinear, parabolic, circular, and oval. The plurality of generator coupling magnets 620 are formed of neodymium or other similar magnetic material with a similar magnetic strength. In some embodiments, the plurality of generator coupling magnets 620 are formed of N52 neodymium.

The generator coupling magnets 620 may be secured to the inner surface 624 using any suitable adhesive, preferable a high temperature adhesive. In the embodiment best illustrated in FIG. 16, the plurality of generator coupling magnets 620 are arranged in an alternating pattern on the inner surface 624 so that alternating poles of each magnet face downward. In other words, the plurality of generator coupling magnets 620 are arranged so that the magnet surfaces 622 form an N-S-N-S repeating pattern around the perimeter of the inner surface 624. However, one of skill in the relevant art will understand that any appropriate arrangement of the plurality of generator coupling magnets 620 may be used. In these embodiments, each generator clutch magnet 610 is positioned on the outer surface 616 so that the pole of each generator clutch magnet 610 that faces downward is opposite the pole of each generator coupling magnet 620 that faces upward so that the magnets will not repel one another through the upper generator flywheel 602.

The lower generator flywheel 604 also has a substantially circular shape. The lower generator flywheel 604 may be formed of materials including but not limited to polypropylene, aluminum, ABS, ABS+, polylactic acid, mild steel (such as A36 mild steel), and acetal (such as Delrin®). In one embodiment, the lower generator flywheel 604 is formed from A36 mild steel. In some embodiments, the lower generator flywheel 604 also includes a plurality of generator coupling magnets 626 positioned on an inner surface 632. The generator coupling magnets 620 may be secured to the inner surface 632 using any suitable adhesive, preferable a high temperature adhesive.

Figure 17:
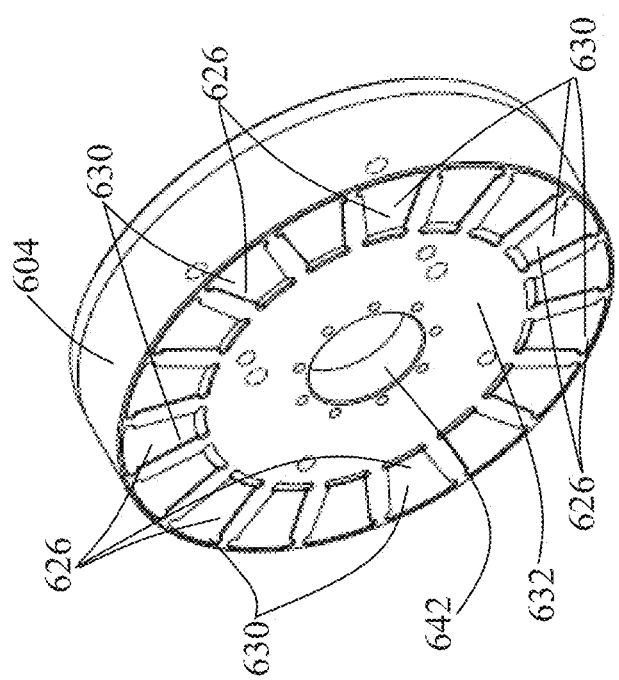
FIG. 17 is a top perspective view of a bottom flywheel of the generator of FIG. 13.
Figure 22:
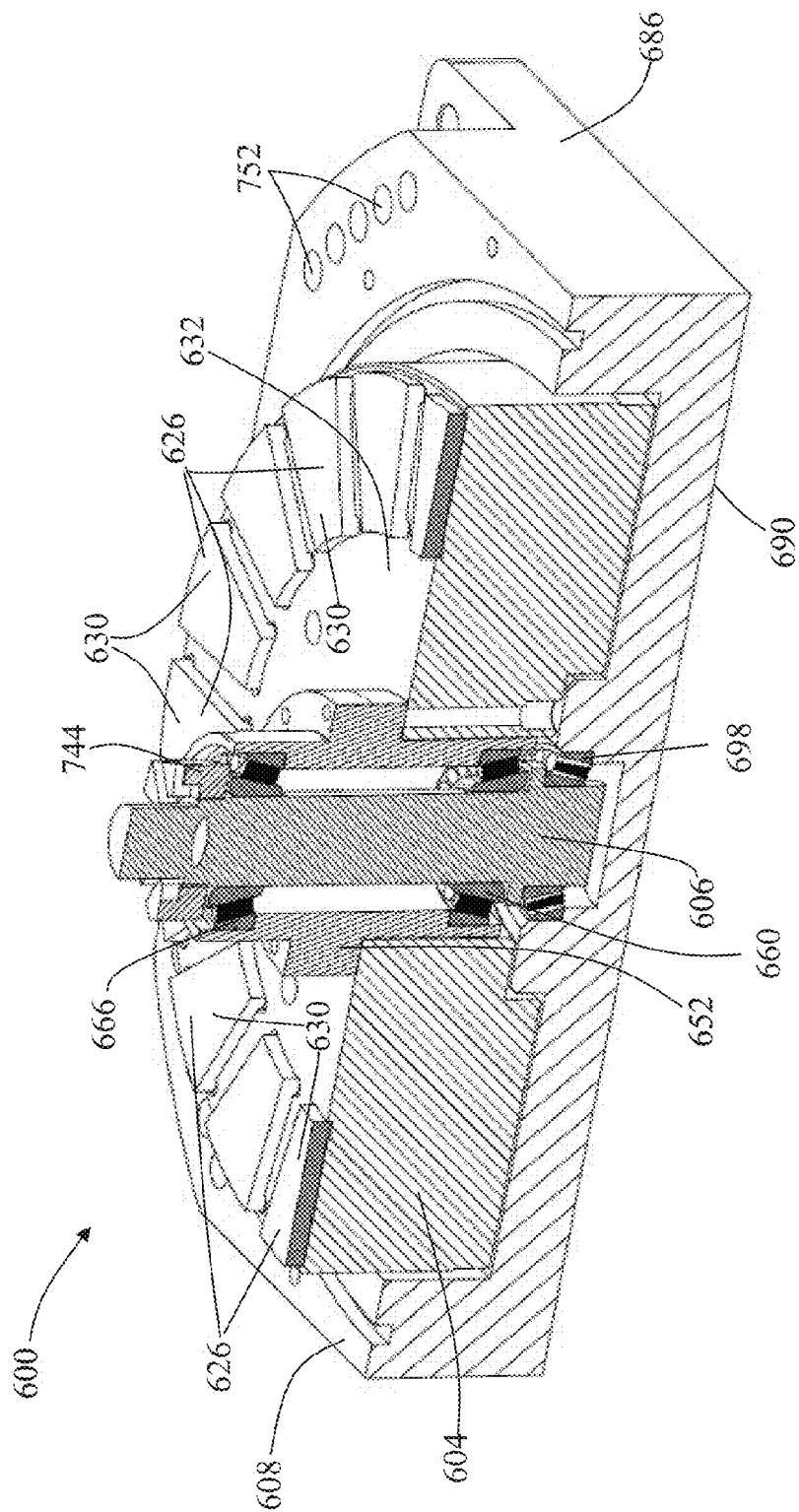
FIG. 22 is a cross-sectional perspective view of the generator of FIG. 13 taken along line 22-22 with the upper and middle sections of the generator casing, the upper flywheel, and the coils removed.
Figure 23:
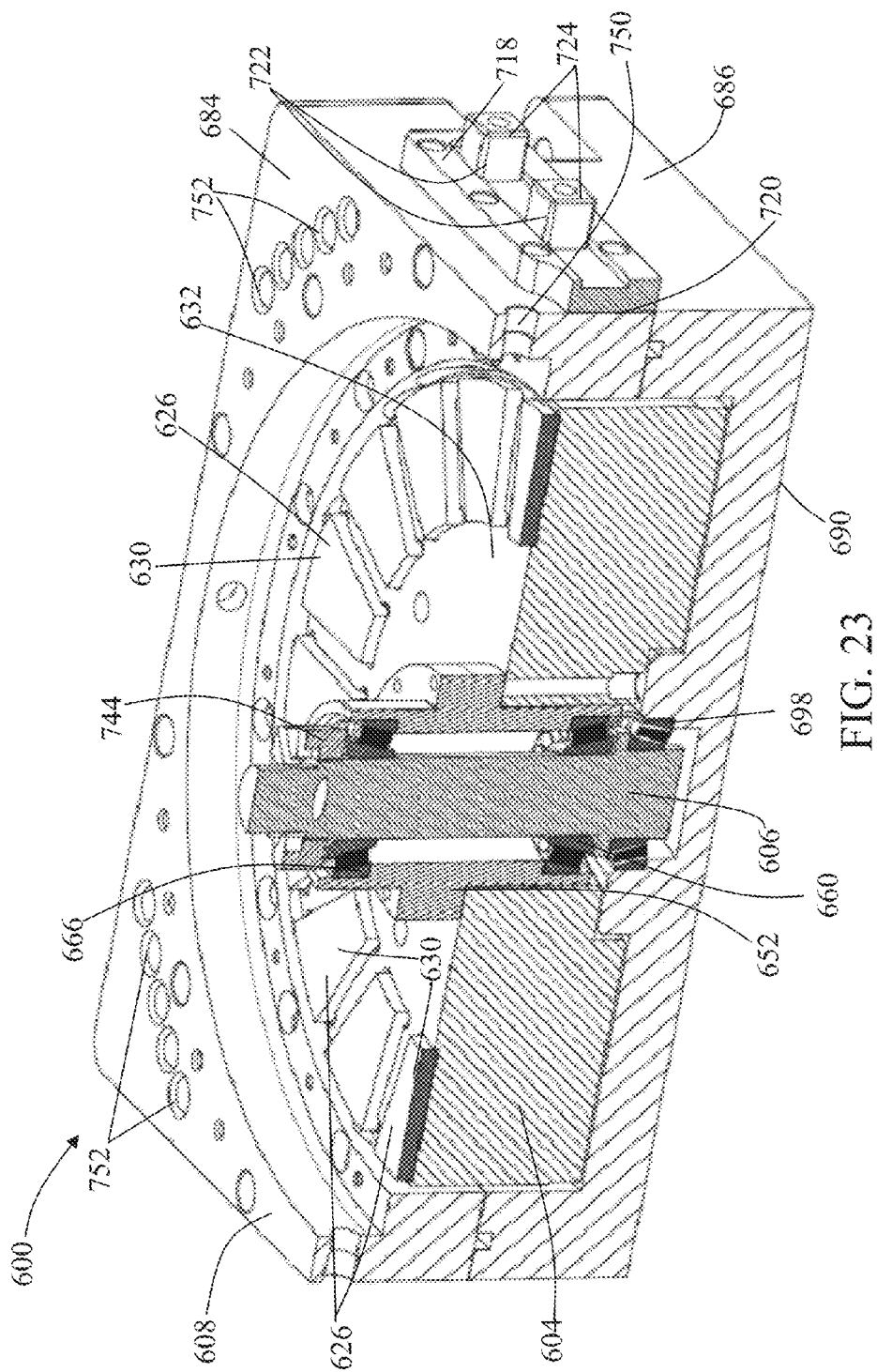
FIG. 23 is a cross-sectional perspective view of the generator of FIG. 13 taken along line 22-22 with the upper section of the generator casing, the upper flywheel, and the coils removed.
Figure 24:
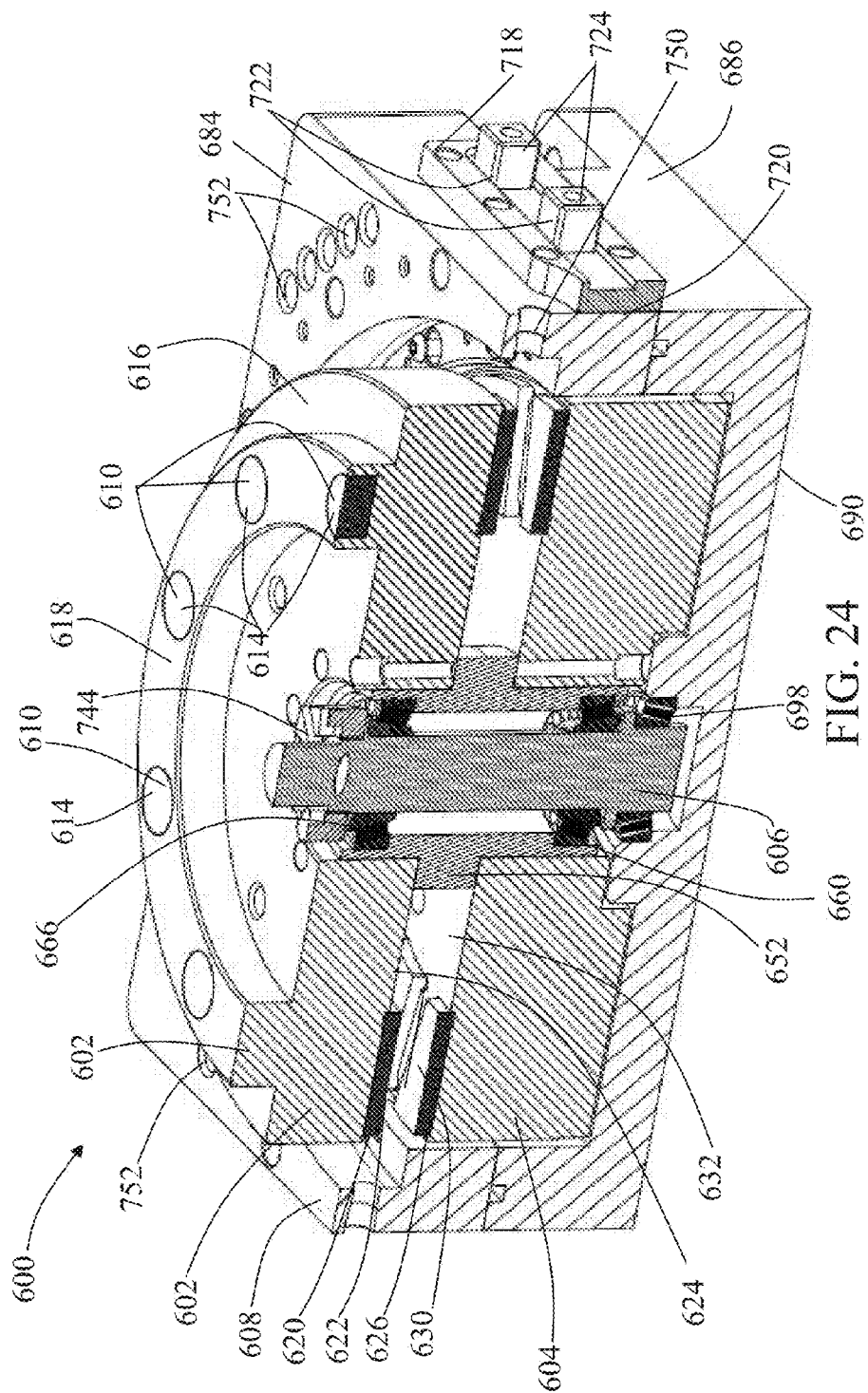
FIG. 24 is a cross-sectional perspective view of the generator of FIG. 13 taken along line 22-22 with the upper section of the generator casing and the coils removed.
Figure 25:
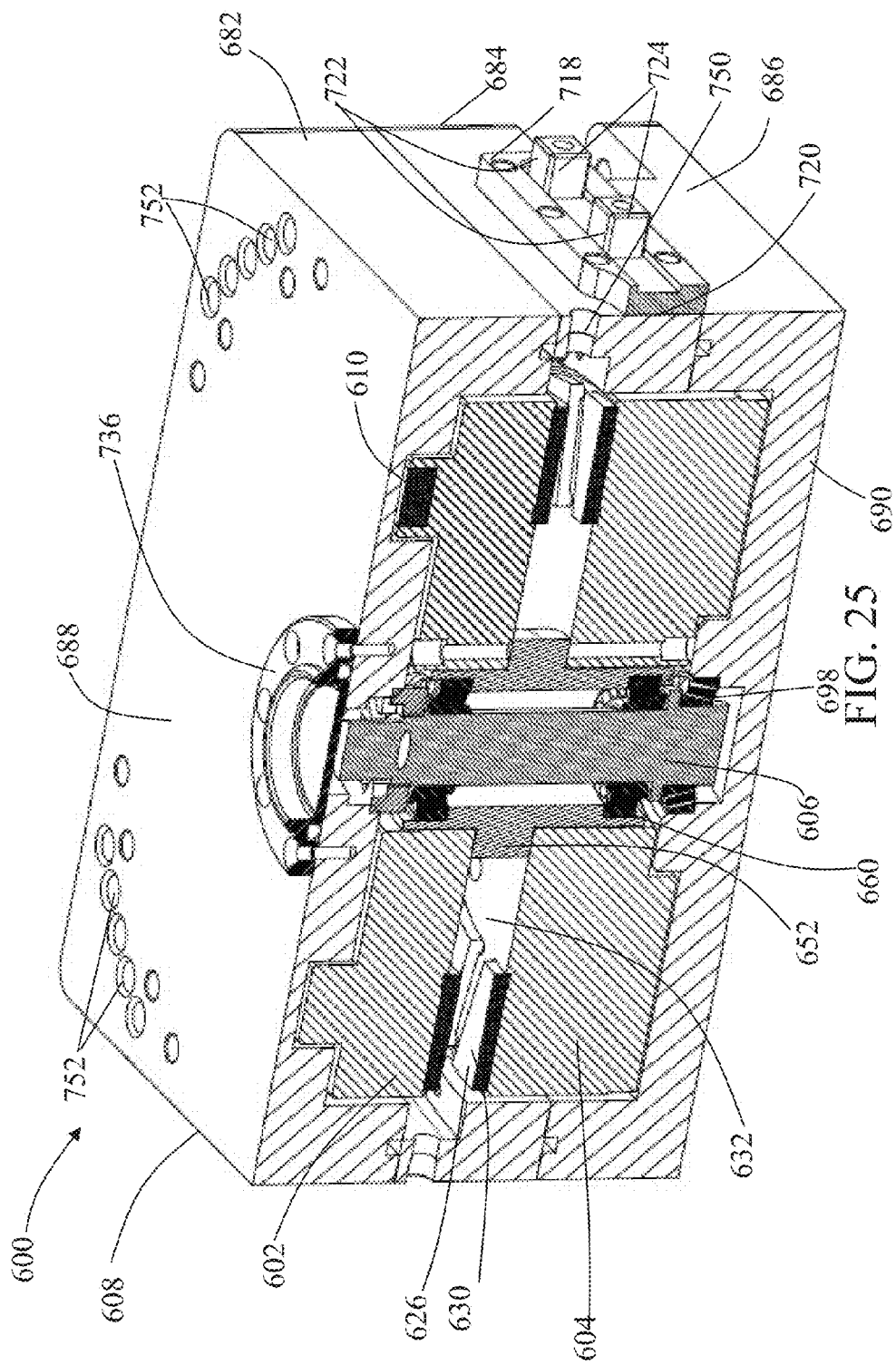
FIG. 25 is a cross-sectional perspective view of the generator of FIG. 13 taken along line 22-22 with the coils removed.

In the embodiment best illustrated in FIGS. 17 and 22, each generator coupling magnet 626 on the lower generator flywheel 604 are also trapezoidal in shape, but one of skill in the art will understand that any suitable shape may be used including but not limited to rectilinear, parabolic, circular, and oval. The plurality of generator coupling magnets 626 are formed of neodymium or other similar magnetic material with a similar magnetic strength. In some embodiments, the plurality of generator coupling magnets 626 on the lower generator flywheel 604 are also formed of N52 neodymium.

The plurality of generator coupling magnets 626 on the lower generator flywheel 604 are arranged in an alternating pattern on the inner surface 632 so that alternating poles of each magnet face upward. In other words, the plurality of generator coupling magnets 626 are arranged so that the magnet surfaces 630 form an N-S-N-S repeating pattern around the perimeter of the inner surface 632. In the embodiment best illustrated in FIG. 17, any suitable number of generator coupling magnets 626 may be used on the lower generator flywheel 604, so long as the number matches the number of generator coupling magnets 620 on the upper generator flywheel 602.

Figure 19:
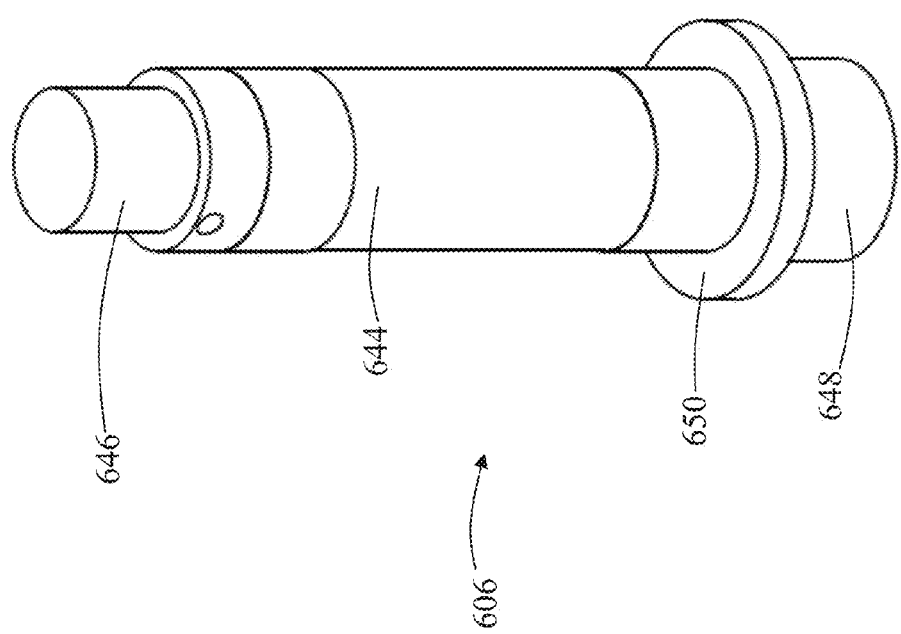
FIG. 19 is a perspective view of a generator shaft of the generator of FIG. 13.
Figure 20:
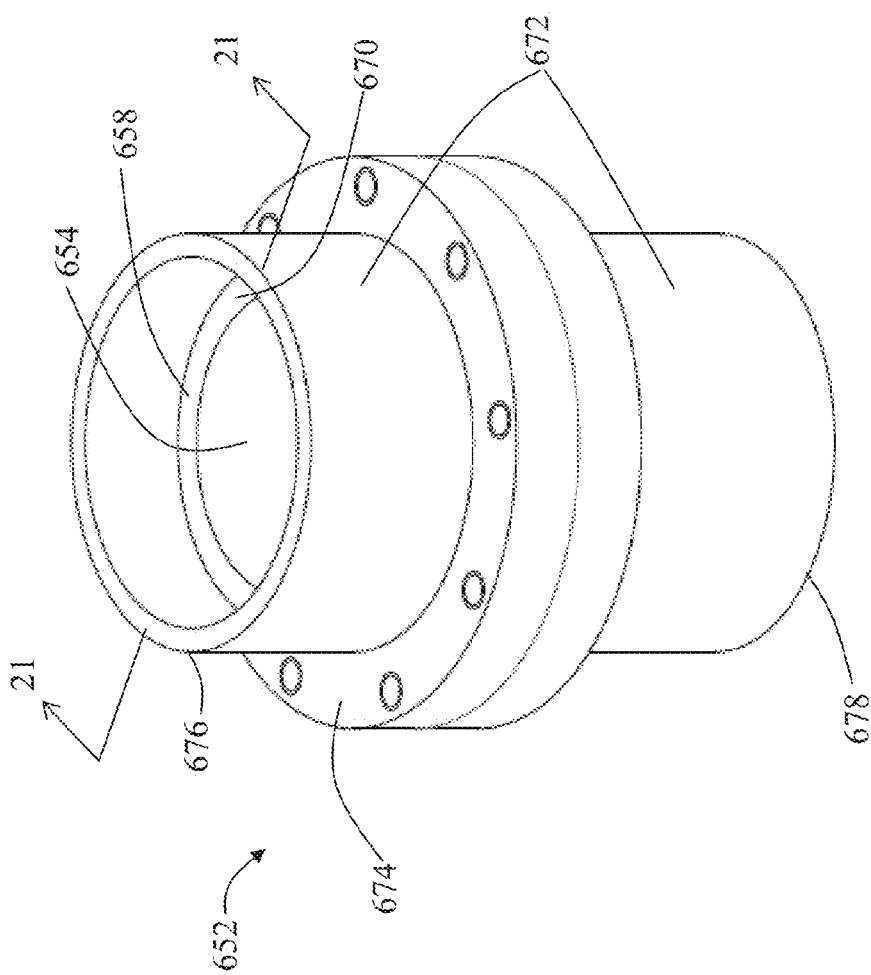
FIG. 20 is a perspective view of a generator hub of the generator of FIG. 13.
Figure 21:
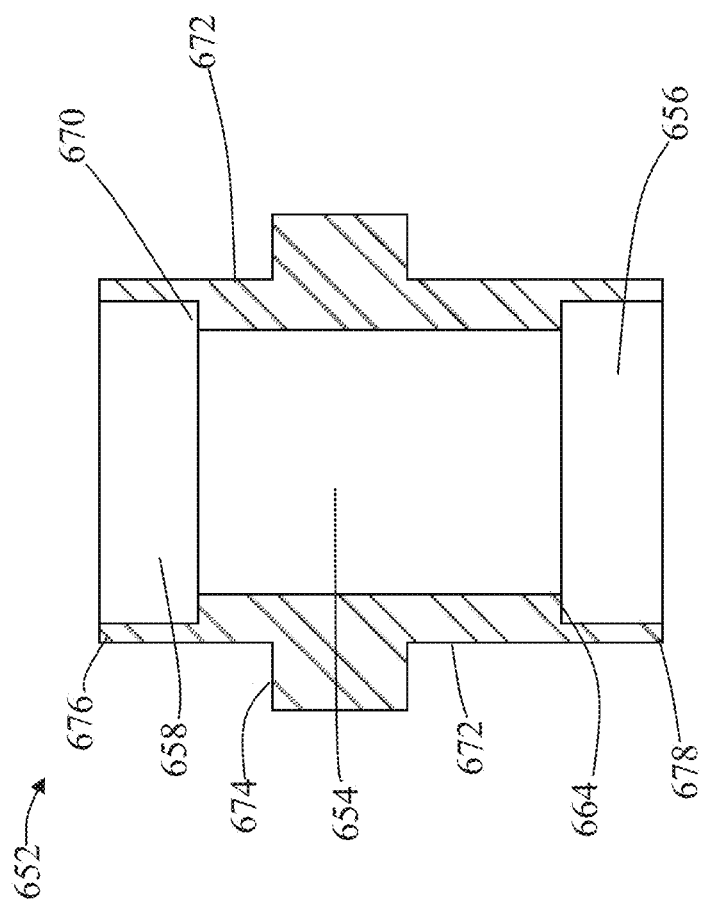
FIG. 21 is a cross-sectional view of the generator hub of FIG. 20 taken along line 21-21.

As shown in FIG. 19, the lower generator flywheel 604 also includes a substantially smooth outer surface 634 that includes a recess 638. In the embodiment shown in FIG. 18, the outer surface 634 does not include any magnets. However, one of skill in the relevant art will understand that the outer surface 634 may or may not include additional magnets as needed.

The generator shaft 606 has a generally circular cross-sectional shape and is inserted through an opening 640 on the upper generator flywheel 602 and an opening 642 on the lower generator flywheel 604. The generator shaft 606 may be formed of materials including but not limited to mild steel, stainless steel, other metallic materials, composite materials, or other similar materials. As can be seen in FIG. 19, the generator shaft 606 includes a main body 644, an upper end 646, a lower end 648, and a ring 650. The upper end 646 has a slightly smaller cross-sectional shape than the cross-sectional shape of the main body 644. The ring 650 is positioned along the main body 644 adjacent the lower end 648. However, one of skill in the art will understand that the ring 650 may be positioned in any appropriate location along the length of the generator shaft 606.

In some embodiments, a generator hub 652 may be used to couple the upper generator flywheel 602 and the lower generator flywheel 604 to the generator shaft 606. The generator hub 652 may be formed of materials including but not limited to mild steel, stainless steel, other metallic materials, composite materials, or other similar materials. In the embodiment best illustrated in FIGS. 20 and 21, the generator hub 652 has a generally cylindrical shape with a circular cross-sectional central bore 654. The central bore 654 is shaped to receive a portion of the main body 644 of the generator shaft 606. In some embodiments, such as the example shown in FIGS. 22-26, the central bore 654 is sized to allow some space between the generator shaft 606 and the generator hub 652. The central bore 654 expands to a first larger cross-sectional receptacle 656 at one end and a second larger cross-sectional receptacle 658 at a second end.

The first receptacle 656 is shaped to receive a first bearing 660 (see, e.g., FIG. 22). The first bearing 660 includes an aperture 662 that is shaped to receive a portion of the main body 644 of the generator shaft 606. In one embodiment, the first bearing 660 comprises a plurality of tapered roller bearings. However, one of skill in the art will understand that any appropriate bearing design may be used. The first bearing 660 is sandwiched between the ring 650 of the generator shaft 606 on a lower side and a ledge 664 on an upper side, where the ledge 664 is formed at the transition point between the central bore 654 and the first receptacle 656.

The second receptacle 658 is shaped to receive a second bearing 666. Like the first bearing 660, the second bearing 666 also includes an aperture 668 that is shaped to receive a portion of the main body 644 of the generator shaft 606. In one embodiment, the second bearing 666 comprises a plurality of tapered roller bearings. However, one of skill in the art will understand that any appropriate bearing design may be used. The second bearing 666 rests on a ledge 670, where the ledge 670 is formed at the transition point between the central bore 654 and the second receptacle 658. When the generator 600 is assembled, the second bearing 666 is sandwiched between the ledge 670 and a fastener 744 that is configured to couple to a first portion of the upper end 646 of the generator shaft 606.

A second portion of the upper end 646 is also configured to couple to a third bearing 746. The third bearing 746 includes an aperture 748 that is shaped to receive the second portion of the upper end 646 of the generator shaft 606. In one embodiment, the third bearing 746 comprises a plurality of straight roller bearings. However, one of skill in the art will understand that any appropriate bearing design may be used. The third bearing 746 rests on fastener 744. When the generator 600 is assembled, the fastener 744 is sandwiched between the fastener 744 on a lower side and an upper receptacle 730 located on an inner surface of the generator casing 608.

The generator hub 652 also includes an outer surface 672. In some embodiments, a ring 674 is coupled to the outer surface 672. The ring 674 has an inner cross-sectional shape that substantially conforms to the outer cross-sectional shape of the generator hub 652. In some embodiments, such as the embodiment shown in FIGS. 20-21, the ring 674 is integrally formed with the generator hub 652. In other embodiments, the ring 674 is attached to the generator hub 652. In the embodiment illustrated in FIGS. 20-21, the ring 674 has a circular outer cross-sectional shape, but one of skill in the relevant art will understand that the outer cross-section shape of the ring 674 may have any suitable shape including but not limited to rectilinear, oval, trapezoidal, parabolic, hexagonal, pentagonal, or octagonal.

The upper generator flywheel 602 and the lower generator flywheel 604 are positioned along the outer surface 672 of the generator hub 652 adjacent the ring 674. One end 676 of the generator hub 652 is shaped to pass through the opening 640 on the upper generator flywheel 602, and a second end 678 of the generator hub 652 is shaped to pass through the opening 642 on the lower generator flywheel 604. As a result, the two generator flywheels 602 and 604 are separated by the thickness of the ring 674. The upper generator flywheel 602 and the lower generator flywheel 604 are positioned relative to one another so that the inner surface 624 and the inner surface 632 are facing each other. The polarity of the magnet surfaces 622 and 630 cause the two generator flywheels 602 and 604 to rotate relative to one another around the generator shaft 606 until each magnet surface 622 is positioned adjacent the magnet surface 630 having an opposite polarity. The upper generator flywheel 602 and the lower generator flywheel 604 are secured to the ring 674 via mechanical fasteners including but not limited to bolts, screws, rivets, or other suitable fastening devices. The assembly of the upper generator flywheel 602, the lower generator flywheel 604, and the ring 674 forms a rotating component 680 of the generator 600.

The upper generator flywheel 602, the lower generator flywheel 604, the generator hub 652, and the generator shaft 606 are enclosed by the generator casing 608. The generator casing 608 is formed of at least three sections comprising an upper section 682, a middle section 684, and a lower section 686. In the embodiment best illustrated in FIG. 13, the entire generator casing 608 has a substantially cubic shape. Because the upper section 682, the middle section 684, and the lower section 686 are configured to fit together to form the generator casing 608, each of these sections have substantially the same inner and outer cross-sectional shapes, the main differences being that the upper section 682 includes an enclosed end 688 and the lower section 686 include an enclosed end 690, whereas the middle section 684 does not include enclosed ends.

The generator casing 608 can be formed of any suitable construction material, including but not limited to polypropylene, aluminum, ABS, ABS+, polylactic acid, mild steel (such as A36 mild steel), and acetal (such as Delrin®). In one embodiment, the generator casing 608 is formed from a polypropylene co-polymer.

Figure 26:
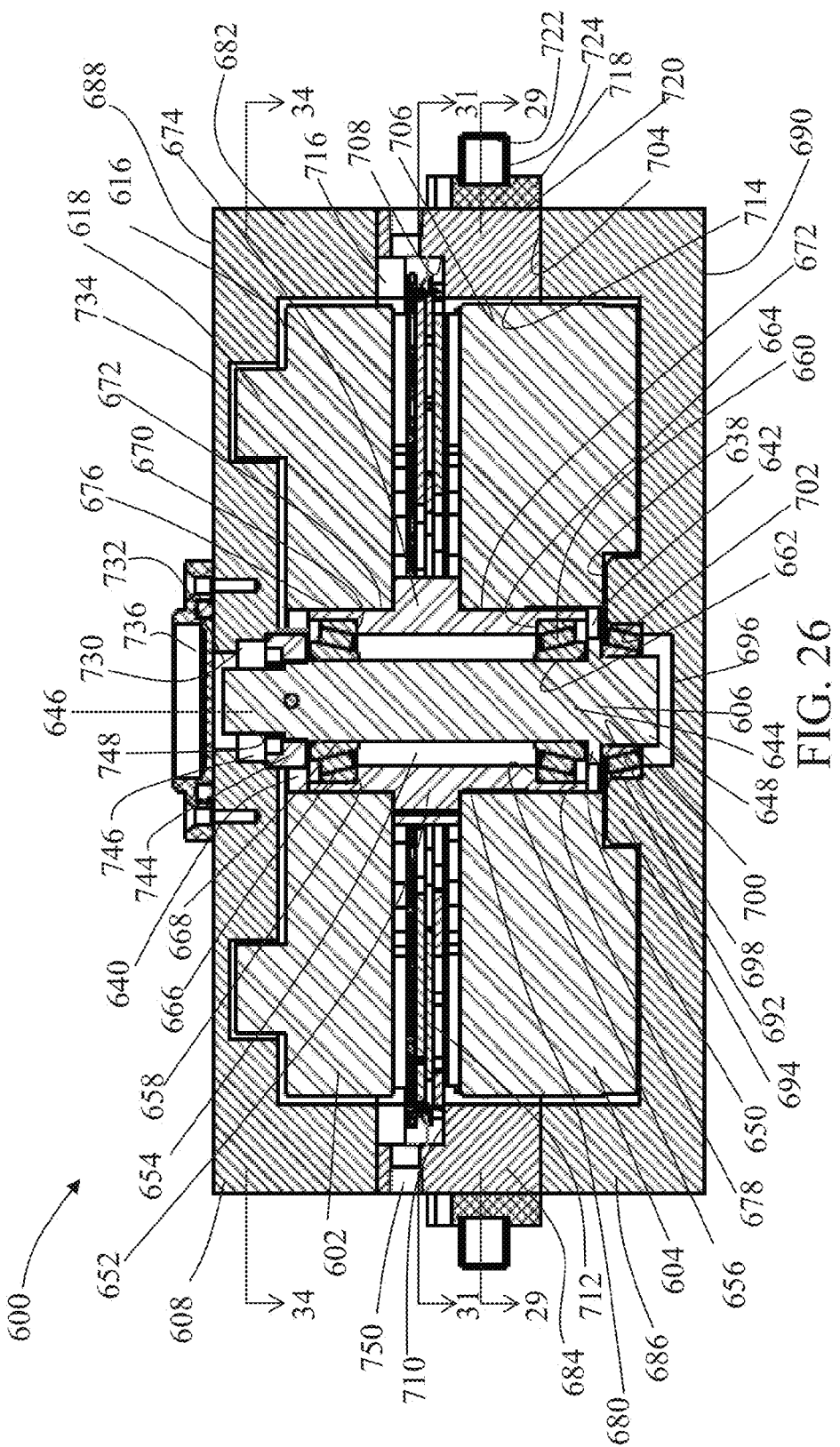
FIG. 26 is a cross-sectional view of the generator of FIG. 13 taken along line 22-22.
Figure 29:
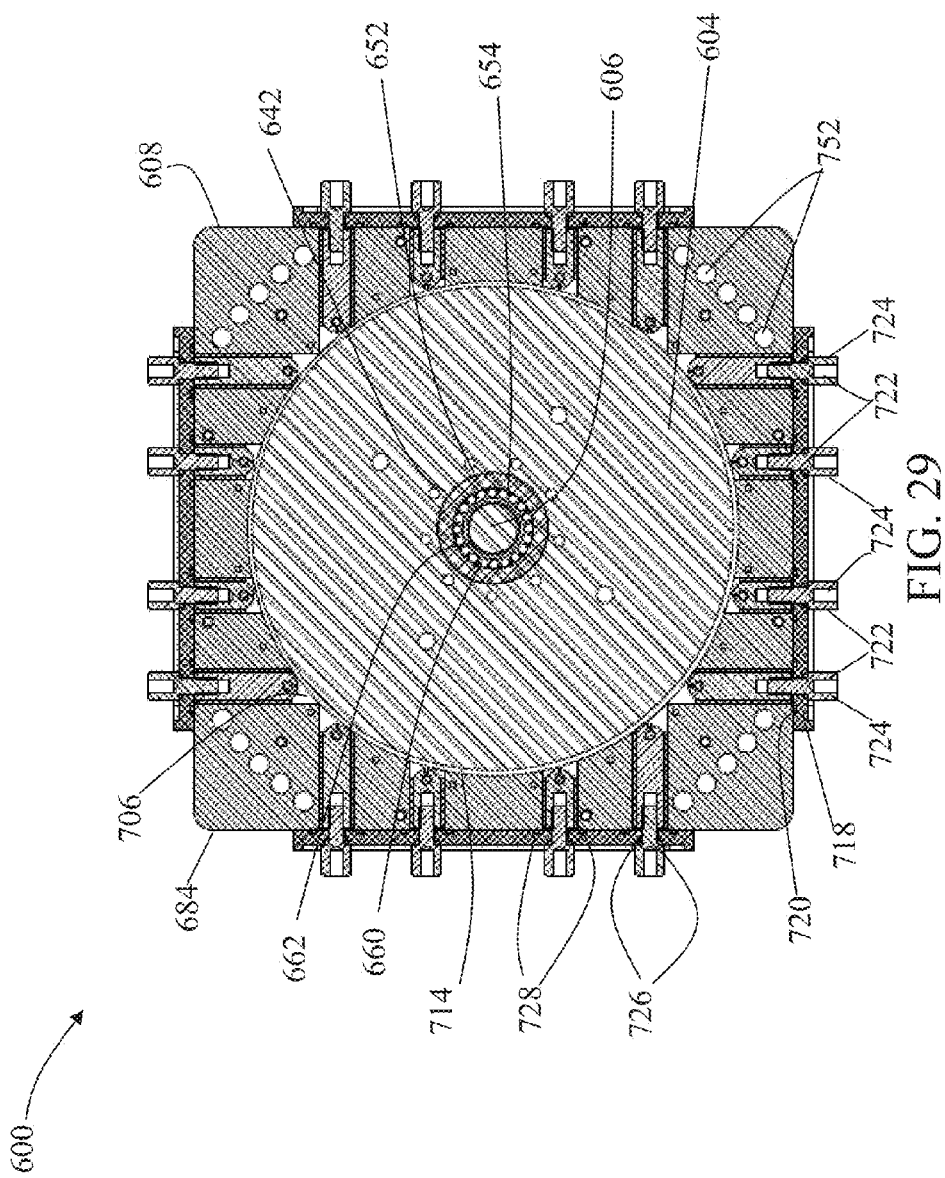
FIG. 29 is a cross-sectional view of the generator of FIG. 26 taken along line 29-29.
Figure 30:
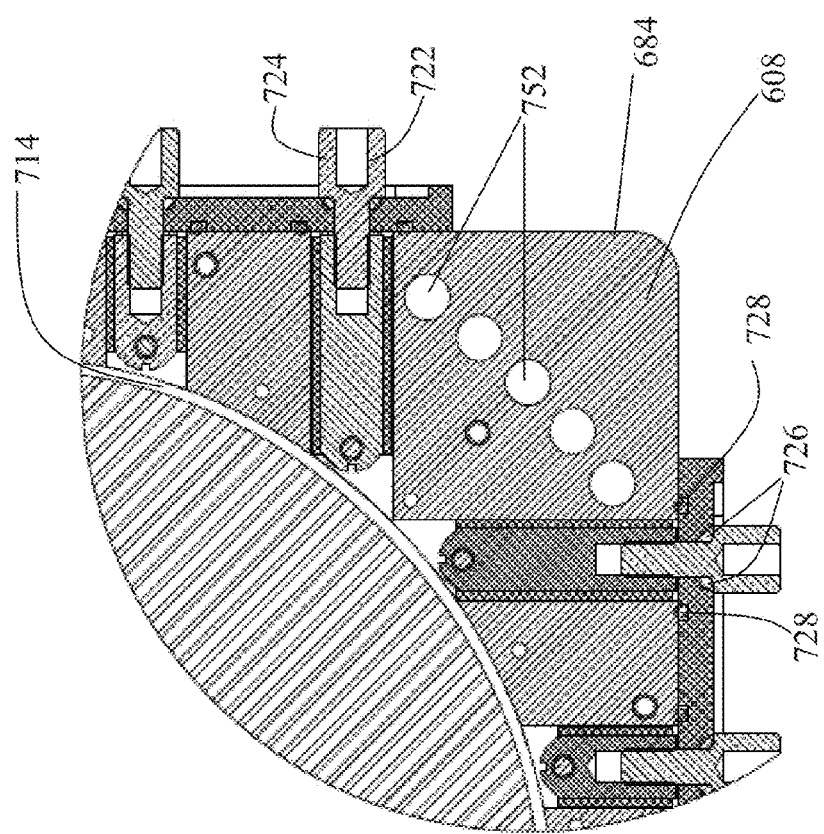
FIG. 30 is a partial cross-sectional view of the generator of FIG. 29.
Figure 31:
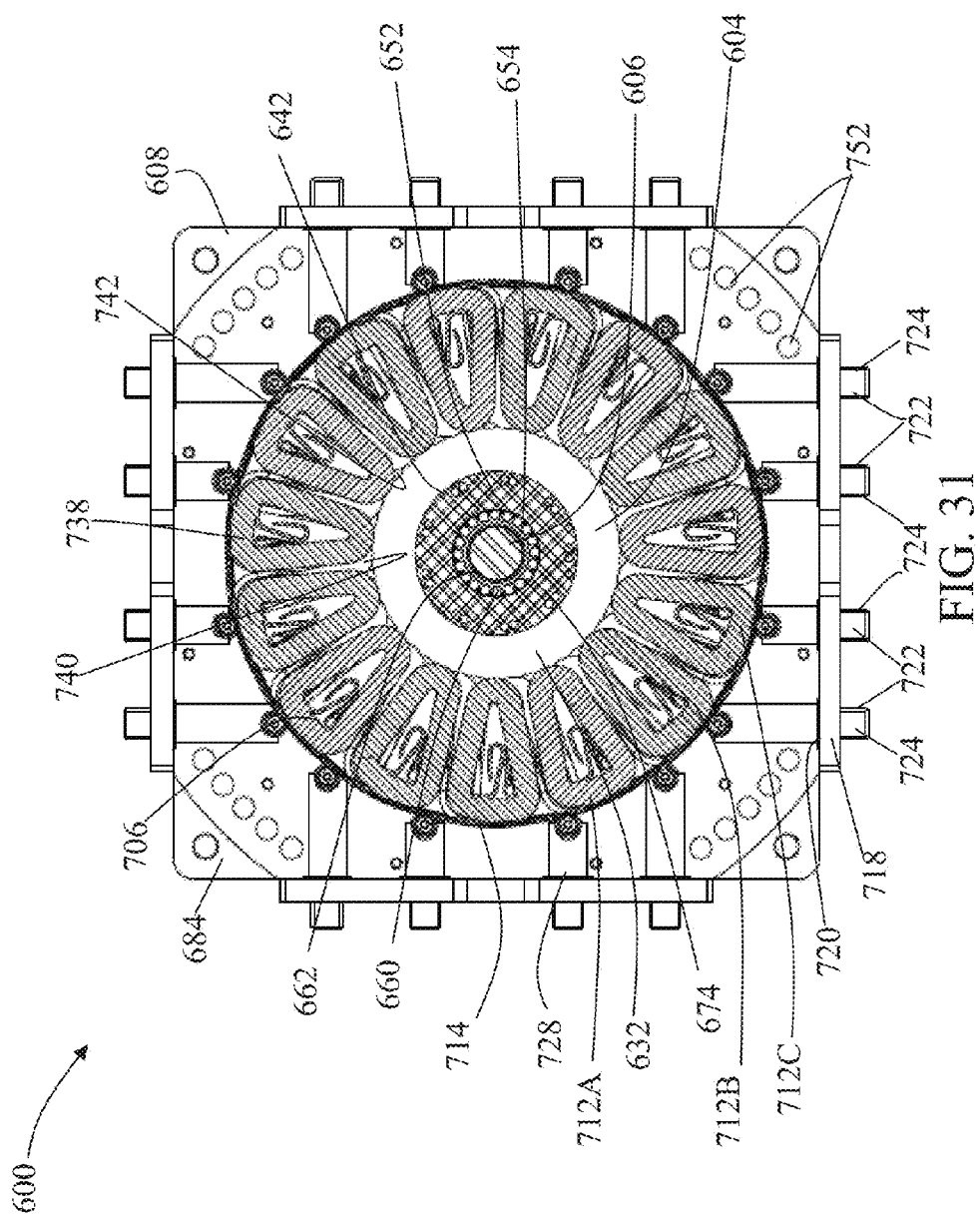
FIG. 31 is a cross-sectional view of the generator of FIG. 26 taken along line 31-31.
Figure 34:
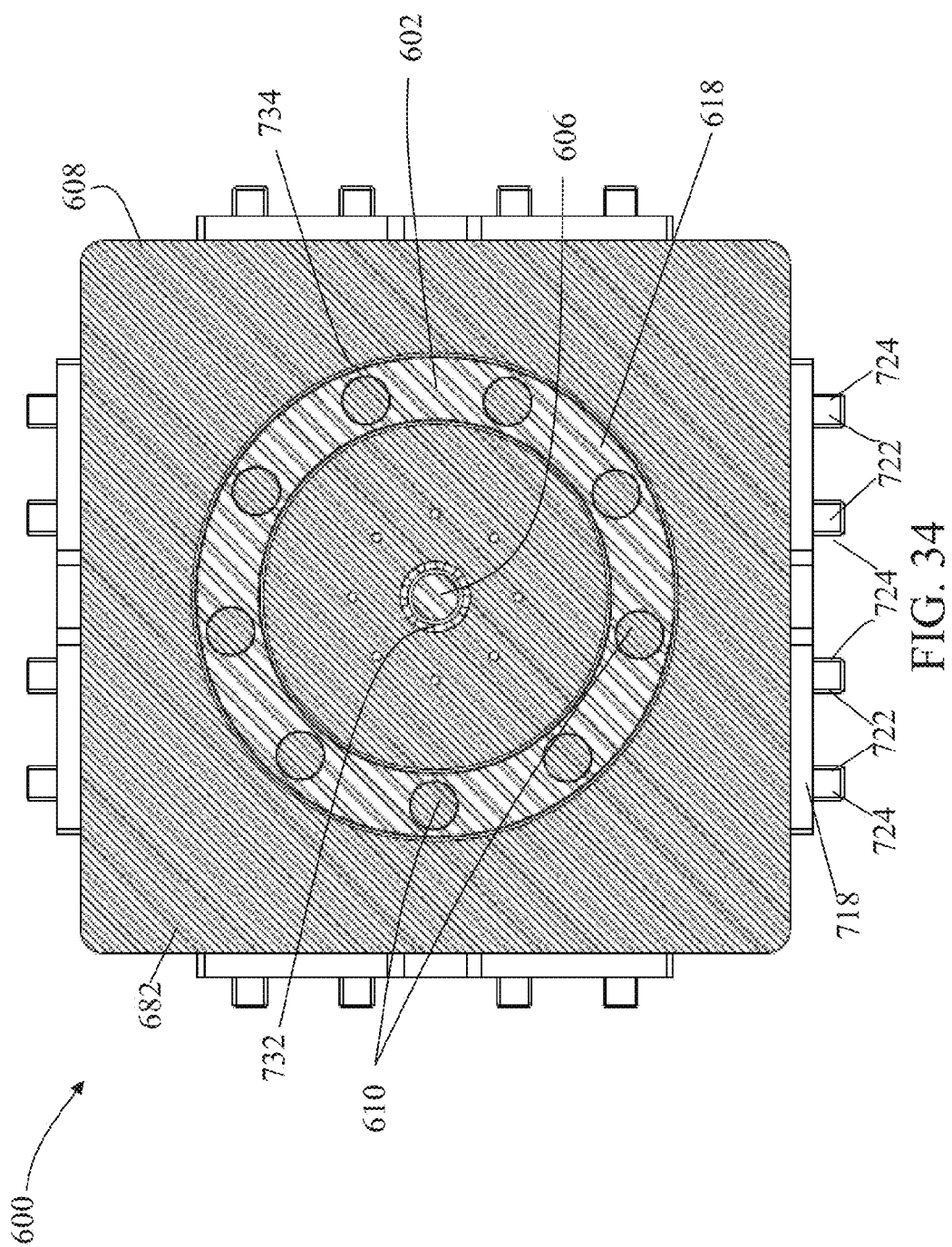
FIG. 34 is a cross-sectional view of the generator of FIG. 26 taken along line 34-34.
Figure 35A:
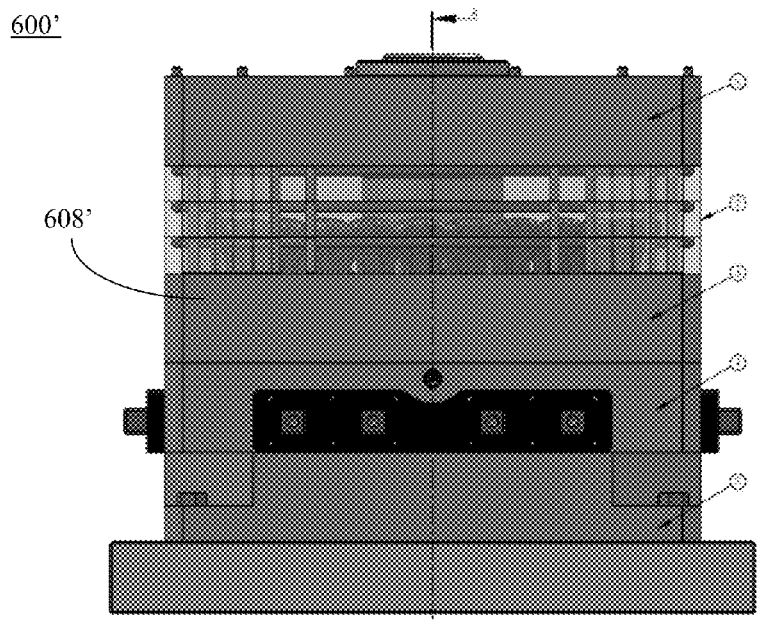
FIG. 35A is a front view of an exemplary generator according to certain exemplary embodiments.
Figure 35B:
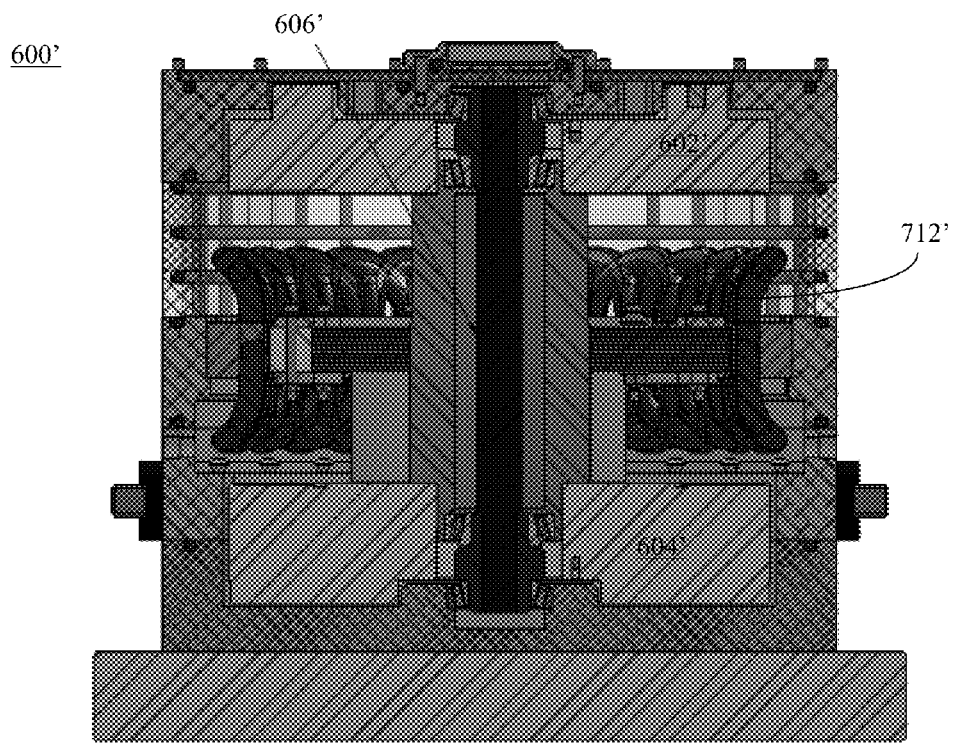
FIG. 35B is a front cross-sectional view of the exemplary generator of FIG. 35A.
Figure 38A:
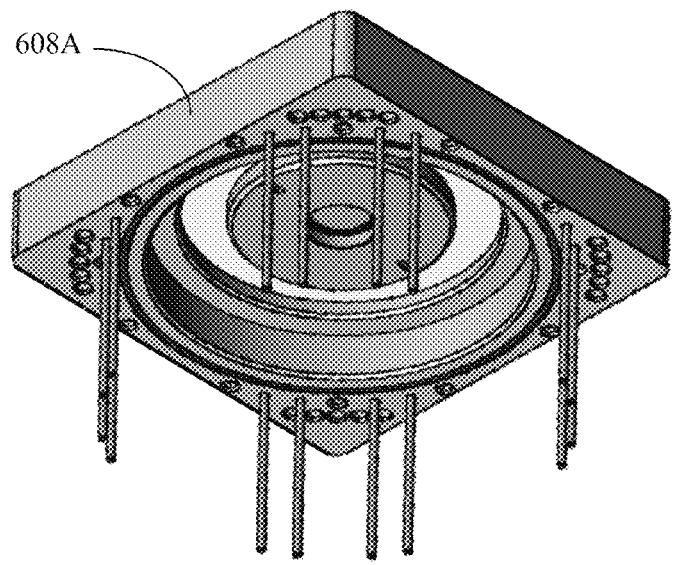
FIGS. 38A-E are perspective views of the various sections of the casing of the generator of FIG. 35A.
Figure 38B:
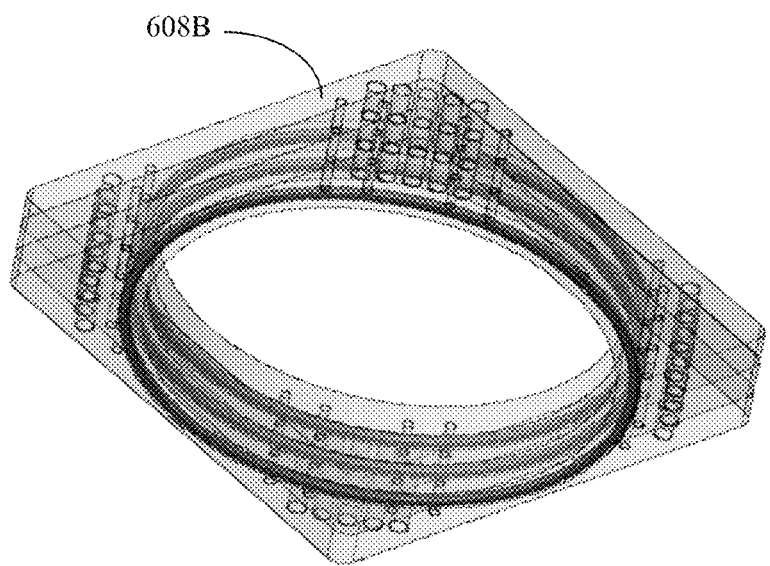
Figure 38C:
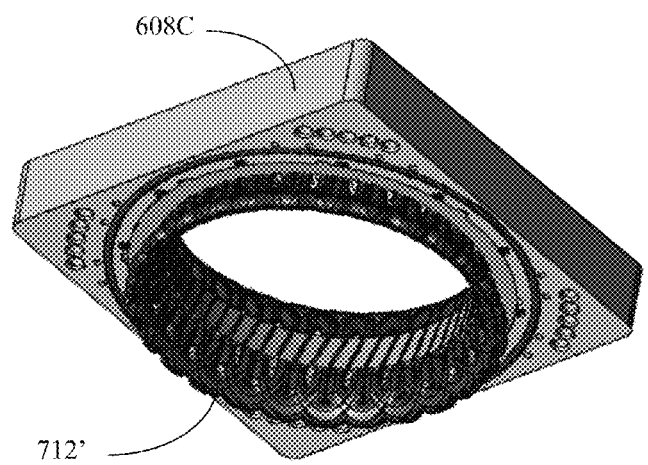
Figure 38D:
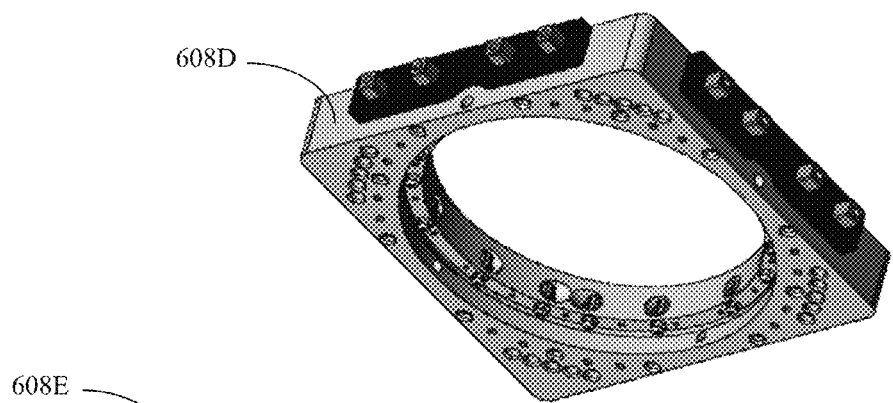
Figure 38E:
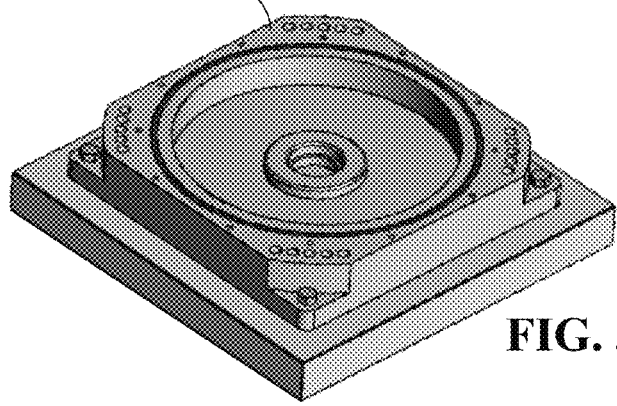

As shown in FIG. 26, the lower section 686 also includes a lower receptacle 692, a projection 694, and a recess 696. The lower receptacle 692 is surrounded by the projection 694. The lower receptacle 692 is shaped to receive a fourth bearing 698. The fourth bearing 698 includes an aperture 700 that is shaped to receive a portion of the lower end 648 of the generator shaft 606. In one embodiment, the fourth bearing 698 comprises a plurality of tapered roller bearings. However, one of skill in the art will understand that any appropriate bearing design may be used. The fourth bearing 698 rests on a ledge 702; the ledge 702 is formed at the transition point between the lower receptacle 692 and the recess 696. When the generator 600 is assembled, the fourth bearing 698 is sandwiched between the ring 650 of the generator shaft 606 on an upper side and the ledge 702 on a lower side.

The projection 694 on the lower section 686 of the generator casing 608 is shaped to be inserted within the recess 638 of the outer surface 634 of the lower generator flywheel 604. In some embodiments, the inner cross-sectional shape of the lower section 686 has a diameter that ranges from 0.01 inches to 0.02 inches larger than the outer diameter of the lower generator flywheel 604. In some embodiments, at least a portion of the lower generator flywheel 604 extends above an upper surface 704 of the lower section 686.

It is desirable to use the nested combination of the first bearing 660 and the fourth bearing 698 (and the similar nested combination of the second bearing 666 and the third bearing 746) because the combination of bearings at each end of the generator shaft 606 and the generator hub 652 minimizes the amount of torque applied to the generator shaft 606 when the generator hub 652 suddenly accelerates. If the generator shaft 606 were fixedly coupled to the generator casing 608, then excessive torque would be applied to the generator shaft 606 by the generator hub 652.

To assemble the generator 600, the fourth bearing 698 is inserted in the lower receptacle 692 of the lower section 686 of the generator casing 608. The lower end 648 of the generator shaft 606 is coupled to the recess 696. The first bearing 660 is then inserted over the generator shaft 606 until the first bearing 660 rests on the ring 650 of the generator shaft 606.

Separately, the rotating component 680 is partially assembled. The lower generator flywheel 604 is coupled to the generator hub 652 adjacent a lower side of the ring 674 via mechanical fasteners. The generator hub 652 is then inserted over the generator shaft 606 until the first receptacle 656 is positioned adjacent the first bearing 660 and the central bore 654 surrounds a substantial portion of the main body 644 of the generator shaft 606.

The middle section 684 of the enclosure is then assembled over the lower section 686. The middle section 684 has a central opening 706 that is shaped to surround the portion of the lower generator flywheel 604 that extends above the upper surface 704 of the lower section 686. In some embodiments, the cross-sectional shape of the central opening 706 has a diameter that ranges from 0.01 inches to 0.02 inches larger than the outer diameter of the lower generator flywheel 604.

The central opening 706 transitions to a larger cross-sectional opening 708 to form a ledge 710. The middle section 684 includes a plurality of generator coils 712 that are coupled to an interior side 714 of the middle section 684 adjacent the ledge 710. The generator coils 712 may be formed of materials including but not limited to copper or other similar conductive materials. The generator coils 712 may also be coated with a high temperature polymeric coating to prevent shorting out when the generator coils 712 contact one another. The plurality of generator coils 712 are positioned adjacent the inner surface 632 of the lower generator flywheel 604 and surrounding the ring 674.

The plurality of generator coils 712 may be arranged in a multi-layer configuration. For example, in the embodiment shown in FIGS. 26-28 and 32-33, the configuration includes a first layer 738, a second layer 740, and a third layer 742. Each layer is rotated slightly with respect to the other layers. In the specific embodiment shown in FIGS. 32-33, the third layer 742 is rotated approximately 8 degrees with respect to the second layer 740, and the second layer 740 is rotated approximately 8 degrees with respect to the first layer 738. The exact amount of rotation is determined by the total number of coils present in each layer. In the embodiment shown in FIGS. 32-33, each layer has a total of fifteen coils, which translates into a total distance of 24 degrees between each coil. However, one of skill in the relevant art will understand that any appropriate number of coils or layer configuration may be used.

Within each layer, the plurality of generator coils 712 are divided into three phases (A, B, and C) that are effectively spaced apart by 120 degrees, and the generator coils 712 within each phase are sequentially coupled to one another and evenly distributed around the circumference of each layer. Specifically, the outside wind of one generator coil 712 within each phase is coupled to the inner wind of a second generator coil 712 within the same phase and the same layer. Thus, a total of nine separate generator coils 712 (A1, B1, C1, A2, B2, C2, A3, B3, and C3) are formed within the plurality of generator coils 712.

For example, the plurality of generator coils 712A are sequentially connected to one another, but each coil 712A is separated from another generator coil 712A by a coil 712B and a generator coil 712C. Similarly, the plurality of generator coils 712B are sequentially connected to one another, but each generator coil 712B is separated from another generator coil 712B by a generator coil 712A and a generator coil 712C. Finally, the plurality of generator coils 712C are sequentially connected to one another, but each generator coil 712C is separated from another generator coil 712C by a generator coil 712A and a generator coil 712B.

The resulting Voltage A produced by the plurality of generator coils 712A is 120 degrees out of phase from the Voltage B produced by the plurality of generator coils 712B, and the resulting Voltage B produced by the plurality of generator coils 712B is 120 degrees out of phase from the Voltage C produced by the plurality of generator coils 712C.

Moreover, due to the rotation between the three layers 738, 740, and 742, the Voltage A from the first layer 738 is eight degrees out of phase with the Voltage A from the second layer 740, and the Voltage A from the second layer 740 is eight degrees out of phase with the Voltage A from the third layer 742. The same pattern is seen for the Voltage B's from each layer and the Voltage C's from each layer. As a result, the configuration of the plurality of coils 712 produces a nine-phase voltage output.

In some embodiments, a second ring 716 is positioned above the plurality of generator coils 712 adjacent the ledge 710, where the second ring 716 is shaped to have an outer diameter that substantially corresponds to the shape of the larger cross-sectional opening 708 and an inner diameter that substantially corresponds to a diameter that ranges from 0.01 inches to 0.02 inches larger than the outer diameter of the upper generator flywheel 602. The purpose of the second ring 716 is to act as a clamp to hold the generator coils 712 in place.

At least one connection plate 718 is coupled to an exterior surface 720 of the middle section 684. In some embodiments, such as the embodiment shown in FIGS. 29, 31, and 34, four connection plates 718 connected to the four exterior surfaces of the middle section 684. The connection plate 718 includes at least two connectors 722. In some embodiments, the connection plate 718 includes four connectors 722. Each connector 722 includes a metal receptacle 724, an outer o-ring 726, and an inner o-ring 728. The metal receptacle 724 is configured to be inserted through the connection plate 718 and at least partially through the wall of the middle section 684. The metal receptacle 724 may be formed of materials including but not limited to brass or other similar conductive materials. An exterior end of the metal receptacle 724 protrudes from an exterior side of the connection plate 718. The outer o-ring 726 is positioned between the metal receptacle 724 and the connection plate 718. The inner o-ring 728 is positioned between the connection plate 718 and the exterior surface 720 of the middle section 684. Both o-rings 726 and 728 may be formed of any suitable material including but not limited to nitrile rubber, Buna N rubber, or other similar elastic materials that form a seal. The positioning of o-rings 726 and 728 is designed to prevent the introduction of air into the generator 600.

In the embodiments of the generator coils 712 having a nine-phase voltage output, each one of the nine voltage outputs is coupled to a different connector 722 to transfer each voltage output separately from the generator 600, where external wires are coupled to each of the connectors 722. In the particular embodiment where each connection plate 718 includes four connectors 722, there are five open connectors 722. As a result, this embodiment provides for up to sixteen-phase voltage output without the need to add additional connectors 722.

At least one connection port 750 is located on the exterior surface 720 of the middle section 684 adjacent the connection plate 718. In some embodiments, such as the embodiments shown in FIGS. 13, 14, 23, 24 and 26, a connection port 750 may be located on one or more of the four exterior surfaces of the middle section 684. Each connection port 750 may be utilized for a different purpose. For example, one connection port 750 may be used for the purpose of applying a vacuum to the generator 600. A second connection port 750 may be used to couple pressure gauge to monitor the pressure within the generator 600. In some embodiments, it is desirable to maintain the pressure at approximately 0 psi. In the embodiments where the generator casing 608 is formed of a polypropylene co-polymer and placed under vacuum, it is desirable to have the thickness of the generator casing 608 as thick as possible to prevent collapse. In these embodiments, use of a track 734 within the upper section 682 that is shaped to substantially conform to the shape of the raised ring 618 provides a way to have a thin region in the area where the turbine clutch magnets 490 and the generator clutch magnets 610 are coupled, while maintaining a greater thickness throughout the remained of the generator casing 608. Typically, it is desirable to maintain the thickness of the generator casing 608 walls at approximately 0.25 inches. In embodiments where the interior of the generator casing is maintained in a vacuum, all connection ports 750 will need to be appropriately sealed, using o-rings or other suitable sealing elements.

A third and fourth connection ports 750 may be used to connect a cooling system 270 to the generator 600, where one of the connection ports 750 is an inlet and the other connection port 750 is an outlet for the cooling system 270. One embodiment of a cooling system 270 is described in more detail below. One of skill in the relevant art will understand that any appropriate cooling system may be used throughout the generator casing 608 to cool the generator 600. In some embodiments, a plurality of tubes 752 are positioned within the generator casing 608 to provide a circulation path for the coolant. In some embodiments where the generator casing 608 is formed of plastic material, the tubes 752 may integrally formed with the generator casing 608. In some embodiments, a thermistor is embedded with the generator coils 712 to provide temperature information with the current flowing from the generator 600.

The upper generator flywheel 602 is then assembled over the generator hub 652 and adjacent the ring 674, the plurality of generator coils 712, and optionally the second ring 716. When the upper generator flywheel 602 is secured to the ring 674 via mechanical fasteners, the rotating component 680 has been assembled. The second bearing 666 is then positioned within the second receptacle 658 of the generator hub 652. The fastener 744 is then coupled to the first portion of the upper end 646 of the generator shaft 606.

A second portion of the upper end 646 is also configured to couple to a third bearing 746. The third bearing 746 includes an aperture 748 that is shaped to receive the second portion of the upper end 646 of the generator shaft 606. In one embodiment, the third bearing 746 comprises a plurality of straight roller bearings. However, one of skill in the relevant art will understand that any appropriate bearing design may be used. The third bearing 746 is configured to be received by an upper receptacle 730 located on an inner surface of the generator casing 608. When the generator 600 is assembled, the fastener 744 is sandwiched between the fastener 744 on an lower side and the upper receptacle 730.

Finally, the upper section 682 is prepared to be assembled over the upper generator flywheel 602. The upper section 682 includes the upper receptacle 730 that receives the third bearing 746. The third bearing 746 is inserted in the upper receptacle 730 of the upper section 682 of the generator casing 608. The upper section 682 is then assembled over the upper generator flywheel 602, so that the second portion of the upper end 646 of the generator shaft 606 is coupled to the third bearing 746.

In some embodiments, the upper section 682 also includes an aperture 732 that is shaped to allow access to the third bearing 746. In these embodiments, the enclosed end 688 includes a cover 736. The cover 736 serves as a means to seal the aperture 732 so that the generator casing 608 is atmospherically insulated. In other embodiments, the upper section 682 does not include the aperture 732 and, thus, there is no need to include the cover 736.

When the generator 600 and the turbine assembly 300 are mechanically joined via any suitable mechanical means including but not limited to bolts that secure the two casings 500 and 608, the plurality of generator clutch magnets 610 are magnetically coupled to the similarly arranged plurality of turbine clutch magnets 490 located in the base 414 of turbine flywheel 400. When the turbine assembly 300 and the generator 600 become magnetically coupled, the generator hub 652 is lifted off the first bearing 660 so that the assembled upper generator flywheel 602, lower generator flywheel 604, and the generator hub 652 become magnetically suspended within the generator casing 608. The attraction between the turbine clutch magnets 490 and the plurality of generator clutch magnets 610, the attraction between the plurality of generator coupling magnets 620 and the plurality of generator coupling magnets 626, and the operation of gravity cause the assembled upper generator flywheel 602, lower generator flywheel 604, and the generator hub 652 to be locked into place so that the suspended components are not in physical contact with any surface of the generator shaft 606, the generator casing 608, and the plurality of generator coils 712.

When the turbine flywheel assembly 400 begins to rotate as described above, the turbine flywheel assembly 400 causes the rotating component 680 to begin to rotate. The rotating component 680 is configured to rotate at speeds ranging from approximately 500 rpm to 4000 rpm. In order to minimize the amount of heat produced through friction caused by the rotating component 680, the generator 600 is placed under negative pressure. By minimizing the amount of air internal to the generator 600, there is virtually no resistance encountered by the rotating component 680. Negative pressure within the generator 600 also reduces electrical noise in the generator 600 that would otherwise occur due to static electricity from air in the generator 600.

The rotation of the rotating component 680 generates an electrical current in the plurality of generator coils 712. The electrical current passes through the plurality of generator coils 712 to the at least two connectors 722, where the electrical current passes out of the generator 600. The generator 600 is configured to produce electricity in the range of 10 kw to 25 kw.

The generator 600 provides power on demand; its rotational speed can be altered to change the power output level as desired, by changing rotational speed of the turbine assembly 300. This is as opposed to traditional constant-speed generators that are directly coupled to the power grid, where the 60 Hz cycles dictate the generators' rotational speed. Because the generator 600 is not directly coupled to the power grid, the generator 600 is able to rotate at any speed and produce an electrical current with varying frequency.

The generator 600 may be connected to a power inverter, converter or other suitable device for converting the variable frequency electrical current produced by the generator 600 into AC current with the frequency in sync with the power grid. For example, the electrical current produced by the generator 600 may be converted into direct current and then converted back to AC current with a frequency to match that of the power grid. By connecting the generator 600 to the power grid in this manner, it can be used to sell power to the electrical companies.

Additional energy can be conserved with the use of the cooling system 270, which recycles heat produced in the generator 600 (due to resistance losses in the generator coils 712). A coolant in a closed-loop coil is circulated through the cooling system 270 in the generator 600, where it is heated.

As shown in FIG. 1, the cooling system may be interconnected with the output of the compressed air tanks 130 (e.g., at the nozzles 150). In this configuration, the heated coolant moves, (e.g., by natural convection) to the compressed air system and passes across the air entering the nozzles 150, thus preheating the compressed air entering the turbine assembly 300. By preheating this compressed air, the energy value of the compressed air is increased. The cooling system 270 thus uses heat produced in the generator 600 that would otherwise be lost and returns at least some of it to the system to increase the energy of the compressed air impacting the turbine blade assembly 410 in the turbine assembly 300.

An exemplary generator 600' used in alternative embodiments is shown in FIGS. 35-38. The generator 600' again includes an upper generator flywheel 602', a lower generator flywheel 604', a generator shaft 606', and a generator casing 608'. The generator casing 608', may comprise several sections 608A-E, as shown in FIGS. 38A-E. Unlike generator 600 of the previously described embodiments, the generator 600' of these alternative embodiments may include a more traditional coil design. The generator coil 712' is mounted within a section 608C of the generator casing 608' and surrounds a magnet holder 607. The magnet holder 607, which may be constructed as shown in FIGS. 37A&B or 37C, holds a plurality of permanent magnets 603 (hereinafter referred to as "generator permanent magnets"). The magnet holder is rotatably mounted to the generator shaft 606' and thus rotates along with the generator flywheels 602', 604'. The rotation of the generator permanent magnets 603 in proximity to the generator coil 712' produces electric power.

The foregoing is provided for purposes of illustrating, explaining, and describing embodiments of the present invention. Further modifications and adaptations to these embodiments will be apparent to those skilled in the art. The features and aspects of the present invention have been described or depicted by way of example only and are therefore not intended to be interpreted as required or essential elements of the invention unless otherwise so stated. It should be understood, therefore, that the foregoing relates only to certain exemplary embodiments of the invention, and that numerous changes and additions may be made thereto without departing from the spirit and scope of the invention.

What is claimed is:

1. A turbine assembly comprising:
a turbine flywheel assembly housed within a turbine casing, wherein the turbine flywheel assembly comprises a turbine flywheel rotatably coupled to a shaft connected to the turbine casing, one or more turbine blade assemblies mounted on the turbine flywheel and comprising a ring of turbine blades, and a magnet motor rotor assembly rotatably coupled to the shaft, wherein the magnet motor rotor assembly comprises a plurality of rotor permanent magnets supported by at least one support plate and arranged in a ring around the shaft such that a pole of each of the rotor permanent magnets having a first polarity faces outward away from the shaft;
a magnet motor stator assembly housed within the turbine casing housing, wherein the magnet motor stator assembly comprises a plurality of stator magnet assemblies supported by at least one stationary support plate and arranged in a ring around the magnet motor rotor assembly, wherein each of the stator magnet assemblies comprises a stator electromagnet and a stator permanent magnet, wherein each of the stator electromagnets comprises a core having a post portion and a substantially flat surface generally perpendicular to the post portion and a conductive coil wrapped around said post portion, wherein in each of the stator magnet assemblies the stator permanent magnet is mounted to the substantially flat surface of the core of the stator electromagnet such that a pole of the stator permanent magnet having the first polarity faces inward toward the stator electromagnet, and wherein each of the stator magnet assemblies is arranged such that the post portion of the stator electromagnet faces inward toward the magnet motor rotor assembly and the stator permanent magnet faces outward toward the turbine casing;
a plurality of selectably controllable nozzles inserted into the turbine casing for injecting compressed air onto the turbine blades;
one or more electromagnet controller connected to the stator electromagnets for individually and selectably activating, deactivating and polarity switching the stator electromagnets;
a control computer in communication with the one or more electromagnet controller and the nozzles for executing computer-executable instructions for controlling the operation thereof; and
one or more power source connected to the stator electromagnets, the electromagnet controllers and the control computer for supplying power thereto.

2. The turbine assembly of claim 1, wherein each of the rotor permanent magnets is substantially parallelogram-shaped.

3. The turbine assembly of claim 1, wherein an outer edge of each of the rotor permanent magnets is curved so that the arrangement of the rotor permanent magnets conforms to the shape of a circle.

4. The turbine assembly of claim 1, wherein each of the stator permanent magnets is substantially parallelogram-shaped.

5. The turbine assembly of claim 1, wherein the post portion of each of the stator electromagnets is angled so as to conform to the curvature of the magnet motor rotor assembly.

6. The turbine assembly of claim 1, wherein the control computer controls the timing and sequence of selective activation, deactivation and polarity switching of the stator electromagnets and the amount and timing of the compressed air injected onto the turbine blades to thereby control the rotational speed of the turbine flywheel assembly.

7. The turbine assembly of claim 1, wherein each of the nozzles is positioned within an air amplification funnel for amplifying the pressure of the compressed air injected onto the turbine blades.

8. The turbine assembly of claim 1, further comprising means for tracking the absolute position of at least one point on the turbine flywheel as it rotates and communicating positional data relating thereto to the control computer.

9. The turbine assembly of claim 1, wherein the one or more power source comprises one or more rechargeable battery.

10. The turbine assembly of claim 1, wherein the turbine flywheel is magnetically coupled to a generator flywheel rotatably mounted within a generator;
wherein the generator comprises a plurality of generator permanent magnets mounted on the generator flywheel and one or more conductive generator coil, and wherein rotation of the turbine flywheel causes rotation of the generator flywheel, which causes the generator permanent magnets to rotate in proximity to the generator coil to thereby generate electricity.

11. The turbine assembly of claim 10, further comprising a load sensor coupled to an output of the generator for sensing an increase or decrease in load and communicating corresponding signals to the control computer.

12. The turbine assembly of claim 10, wherein the generator further comprises a vacuum sealed casing for housing the generator flywheel and the generator coil.

13. A magnet motor assembly comprising:
a flywheel assembly housed within a casing, wherein the flywheel assembly comprises a flywheel rotatably coupled to a shaft connected to the casing and a magnet motor rotor assembly rotatably coupled to the shaft, wherein the magnet motor rotor assembly comprises a plurality of rotor permanent magnets mounted on at least one support plate and arranged in a ring around the shaft such that a pole of each of the rotor permanent magnets having a first polarity faces outward away from the shaft;
a magnet motor stator assembly housed within the casing, wherein the magnet motor stator assembly comprises a plurality of stator magnet assemblies arranged in a ring around the magnet motor rotor assembly, wherein each of the stator magnet assemblies comprises a stator electromagnet and a stator permanent magnet, wherein each of the stator electromagnets comprises a core having a post portion and a substantially flat surface generally perpendicular to the post portion and a conductive coil wrapped around said post portion, wherein one of the stator permanent magnets is mounted to the substantially flat surface of the core of one of the stator electromagnets such that a pole of the stator permanent magnet having the first polarity faces inward toward the stator electromagnet, and wherein each of the stator magnet assemblies is arranged such that the stator electromagnet faces inward toward the magnet motor rotor assembly and the stator permanent magnet faces outward toward the casing;
one or more electromagnet controller connected to the stator electromagnets for individually and selectably activating, deactivating and polarity switching the stator electromagnets; and
one or more power source connected to the stator electromagnets and the electromagnet controllers for supplying power thereto.

14. The magnet motor assembly of claim 13, wherein each of the rotor permanent magnets is substantially parallelogram-shaped.

15. The magnet motor assembly of claim 13, wherein an outer edge of each of the rotor permanent magnets is curved so that the arrangement of the rotor permanent magnets conforms to the shape of a circle.

16. The magnet motor assembly of claim 13, wherein each of the stator permanent magnets is substantially parallelogram-shaped.

17. The magnet motor assembly of claim 13, wherein the post portion of each of the stator electromagnets is angled so as to conform to the curvature of the magnet motor rotor assembly.

18. The magnet motor assembly of claim 13, wherein the control computer controls the timing and sequence of selective activation, deactivation and polarity switching of the stator electromagnets to thereby control the rotational speed of the flywheel assembly.

19. The magnet motor assembly of claim 13, further comprising means for tracking the absolute position of at least one point on the flywheel as it rotates and communicating positional data relating thereto to the control computer.

20. The turbine assembly of claim 13, wherein the one or more power source comprises one or more rechargeable battery.

* * * * *